US006827362B2

United States Patent
Smith et al.

(10) Patent No.: US 6,827,362 B2
(45) Date of Patent: Dec. 7, 2004

(54) SHAFT DRIVEN BICYCLE AND TRANSMISSION THEREFOR

(76) Inventors: Samuel O. Smith, 1241 S. Welch Cir., Lakewood, CO (US) 80228; William J. T. Fleet, 1241 S. Welch Cir., Lakewood, CO (US) 80228

( * ) Notice: Subject to any disclaimer, the term of this patent is extended or adjusted under 35 U.S.C. 154(b) by 0 days.

(21) Appl. No.: 10/291,954

(22) Filed: Nov. 8, 2002

(65) Prior Publication Data

US 2004/0090037 A1 May 13, 2004

(51) Int. Cl.[7] ............................................. B62M 17/00
(52) U.S. Cl. ................................. 280/230; 280/259
(58) Field of Search ........................... 280/230, 259, 280/270, 238, 260; 74/416, 417, 393, 395; 180/223

(56) References Cited

U.S. PATENT DOCUMENTS

| | | | | |
|---|---|---|---|---|
| 2,561,960 A | * | 7/1951 | Weaver | 74/449 |
| 3,863,503 A | * | 2/1975 | Loeb et al. | 74/347 |
| 4,005,611 A | * | 2/1977 | Jeffries | 74/416 |
| 5,224,725 A | * | 7/1993 | Erlston | 280/259 |
| 6,095,540 A | * | 8/2000 | Kim | 280/259 |
| 6,161,855 A | * | 12/2000 | Christini et al. | 280/230 |
| 6,343,807 B1 | * | 2/2002 | Rathbun | 280/276 |
| 6,394,477 B1 | * | 5/2002 | Cellini | 280/260 |
| 6,446,985 B1 | * | 9/2002 | Tompsett | 280/30 |
| 6,478,323 B2 | * | 11/2002 | Chang | 280/260 |

* cited by examiner

Primary Examiner—Lesley D. Morris
Assistant Examiner—Tony Winner
(74) Attorney, Agent, or Firm—Holland & Hart

(57) ABSTRACT

A two-wheel drive bicycle includes a main frame having a steering head, a seat tube, a cross bar and a hollow downtube. A main drive mechanism includes a housing, a driving spindle, at least one driven ring gear, a first driven shaft and a second driven shaft. The first driven shaft is rotatably connected to the housing and operably coupled to the at least one driven ring gear. The second driven shaft is, likewise, rotatably connected to the housing and operably coupled to the at least one driven ring gear. Front and rear wheel drive mechanisms include a series of shafts that are themselves coupled to and between the first and second driven shafts and the front and rear wheels. The main drive mechanism preferably includes a plurality of driven gears comprising a series of concentrically spaced ring gears. Each ring gear of the plurality of driven ring gears has an inner diametrical surface and an outer diametrical surface. Each outer diametrical surface is configured to slidingly engage the inner diametrical surface of an adjacent ring gear. Further, the main drive mechanism preferably includes a biasing means for biasing each ring gear away from the first driven shaft and the second driven shaft and a selective engagement means for selectively engaging one ring gear of the plurality of ring gears with the first driven shaft and the second driven shaft.

26 Claims, 16 Drawing Sheets

SHAFT DRIVEN BICYCLE AND TRANSMISSION THEREFOR

BACKGROUND OF THE INVENTION

1. Field of the Invention

The invention relates to the field of bicycles driven by shafts and, more particularly, to the field of one and two-wheel drive bicycles having one or both of the front wheel and the rear wheel driven by a series of shafts that are themselves coupled to a transmission having a plurality of ring gears.

2. Description of the Prior Art

Two-wheel drive bicycles are known in the art and generally comprise either a shaft drive, a chain or belt drive, a cable drive or some combination thereof. For example, U.S. Pat. No. 4,479,660 (Pattison) describes an endless belt drive system for the front wheel that is driven by the bicycle pedals. In a somewhat similar vein, U.S. Pat. No. 4,773,662 (Phillips) describes a second chain drive system for the front wheel that is driven by an auxiliary hand crank. A cable drive system, on the other hand, is described in U.S. Pat. No. 5,052,705 (Ringle). Instead of being driven by the bicycle pedals or an auxiliary hand crank, the Ringle cable drive is driven by the rotation of the rear wheel, which is itself driven in standard fashion by the bicycle pedals. A similar cable drive is described in U.S. Pat. No. 5,184,838 (Becoat). A combination of chain drives and shafts is described in U.S. Pat. No. 5,158,314 (Farras Pinos). In a manner similar to the Ringle cable drive, the Farras Pinos combination drive is driven by the rotation of the rear wheel. A similar combination of chain drives, cable drives and/or flexible shafts is described in U.S. Pat. No. 5,224,725 (Erlston) and in U.S. Pat. No. 5,332,244 (Turner et al.). Other combinations of drive mechanisms are described in, for example, U.S. Pat. No. 6,095,540 (Kim), U.S. Pat. No. 6,161,854 (Christini et al.), U.S. Pat. No. 6,406,047 (Sawyer, Jr.) and U.S. Pat. No. 6,419,255 (Chang et al.).

SUMMARY OF THE INVENTION

A two-wheel drive bicycle includes a main frame having a steering head, a seat tube, a cross bar and a hollow downtube. A main drive mechanism includes a housing, a driving spindle, at least one driven ring gear, a first driven shaft and a second driven shaft. The housing is connected to the main frame while the driving spindle is rotatably connected to the housing as well as to the pedals of the bicycle. The first driven shaft is rotatably connected to the housing and operably coupled to the at least one driven ring gear. The second driven shaft is, likewise, rotatably connected to the housing and operably coupled to the at least one driven ring gear.

A front wheel drive mechanism includes a first shaft means rotatably positioned inside of the hollow downtube and a second shaft means rotatably positioned inside of a hollow fork tube. The first shaft means has a first end operably coupled to the first driven shaft and a second end operably coupled to the second shaft means. The second shaft means is operably connected to the front wheel. A rear wheel drive mechanism includes a third shaft means rotatably positioned inside of a hollow chain stay. The third shaft means has a first end operably coupled to said second driven shaft and a second end operably coupled to the rear wheel.

The main drive mechanism preferably includes a plurality of driven gears comprising a series of concentrically spaced ring gears. Each ring gear of the plurality of driven ring gears has an inner diametrical surface and an outer diametrical surface. Each outer diametrical surface is configured to engage the inner diametrical surface of an adjacent ring gear. Further, the main drive mechanism preferably includes a biasing means for biasing each ring gear away from the first driven shaft and the second driven shaft and a selective engagement means for selectively engaging one ring gear of the plurality of ring gears with the first driven shaft and the second driven shaft. A shifter mechanism operates the selective engagement means and a user propels the bicycle using a standard pair of bicycle pedals.

Other embodiments of the present invention are contemplated and include use of the main drive mechanism to propel either the front wheel or the rear wheel in a single wheel drive embodiment or to propel both wheels in a two wheel drive or dual wheel drive embodiment. Shock absorbing elements for the front and rear wheels, separately or together, are also contemplated for use with both the single and dual wheel embodiments. Each of the components that make up the contemplated embodiments, moreover, are constructed using standard materials typically used for constructing bicycle frames and components, such as, for example, aluminum, steel or titanium. Alternatively, the components may be constructed using fiber reinforced plastics, which offer superb strength to weigh ratios when compared to other materials.

DETAILED DESCRIPTION OF THE PREFERRED EMBODIMENT

Figure 1:
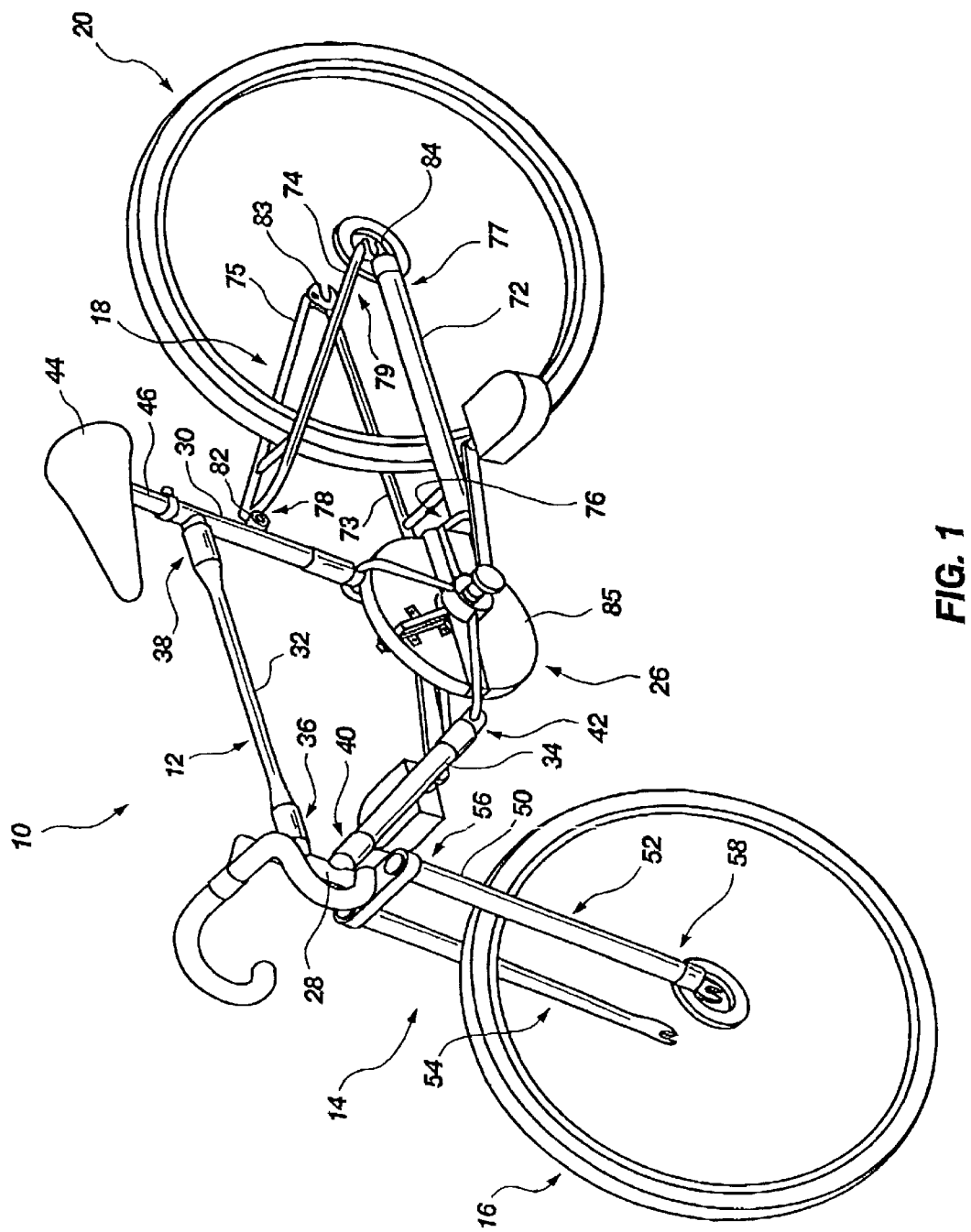
FIG. 1 is a perspective view illustrating a first embodiment of the present invention.
Figure 2:
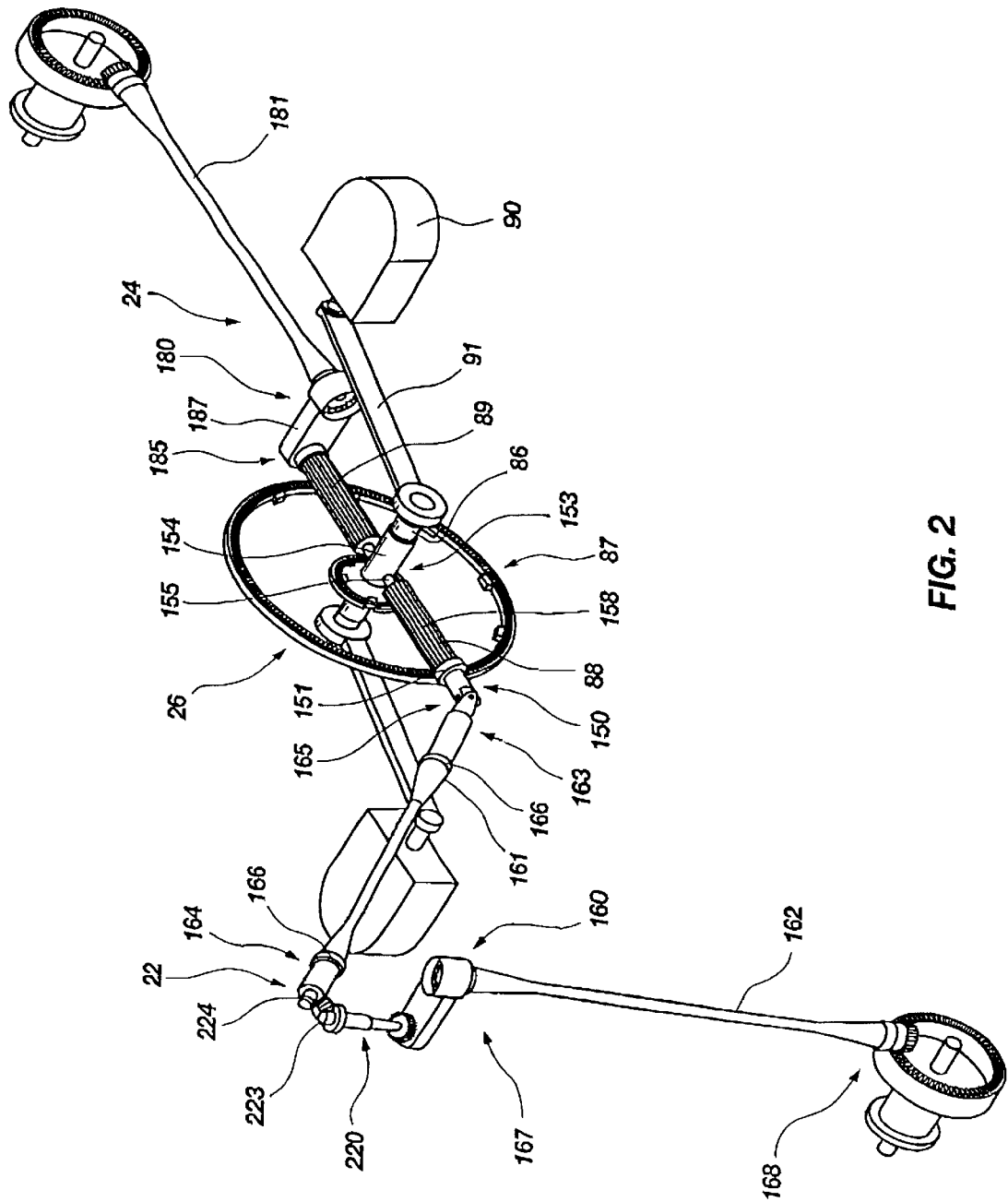
FIG. 2 is a perspective view illustrating the drive train of the embodiment illustrated in FIG. 1.

Referring to FIGS. 1 and 2, a two-wheel drive bicycle 10 includes a main frame 12, a front fork 14, a front wheel 16, a rear frame 18 and a rear wheel 20. The two-wheel drive bicycle 10 further includes front wheel drive means 22 for rotatably driving the front wheel 16, rear wheel drive means 24 for rotatably driving the rear wheel 20 and main drive means 26 for rotatably driving both the front wheel drive means 22 and the rear wheel drive means 24.

More specifically, the main frame 12 includes a steering head 28, a seat tube 30, a cross bar 32 and a downtube 34. The cross bar 32 has a first end 36 and a second end 38. The steering head 28 and the cross bar 32 are connected proximate the first end 36 of the cross bar 32, while the seat tube 30 and the cross bar 32 are connected proximate the second end 38 of the cross bar 32. The downtube 34 is preferably hollow and has a first end 40 and a second end 42. The downtube 34 and the steering head 28 are connected proximate the first end 40 of the downtube. The foregoing connections are accomplished using standard techniques known to those skilled in the art, such as, for example, by welding. Alternatively, press-fit couplings—e.g., press fit couplings 400 and 401—may be used to secure the various frame components together. The benefit of the latter method is the frame may be disassembled to provide easier access to the components that comprise the drive means as described below. A seat 44 is height-adjustably connected to the seat tube 30, also using standard techniques known to those skilled in the art, such as, for example, by a seat post 46 that is slidably engaged with the seat tube 30.

Figure 3:
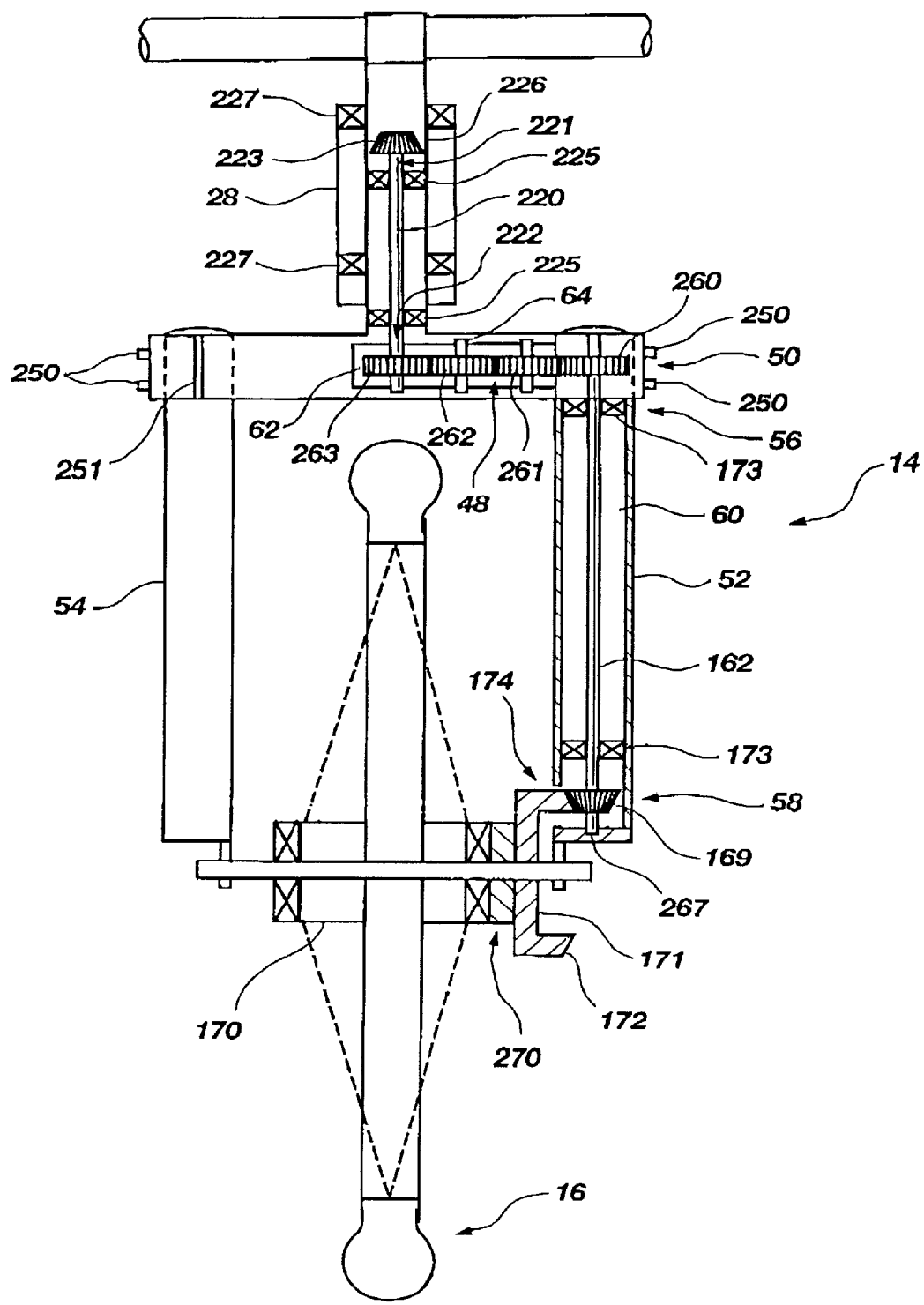
FIG. 3 is a front view of the front fork appearing in the embodiment illustrated in FIG. 1.
Figure 4:
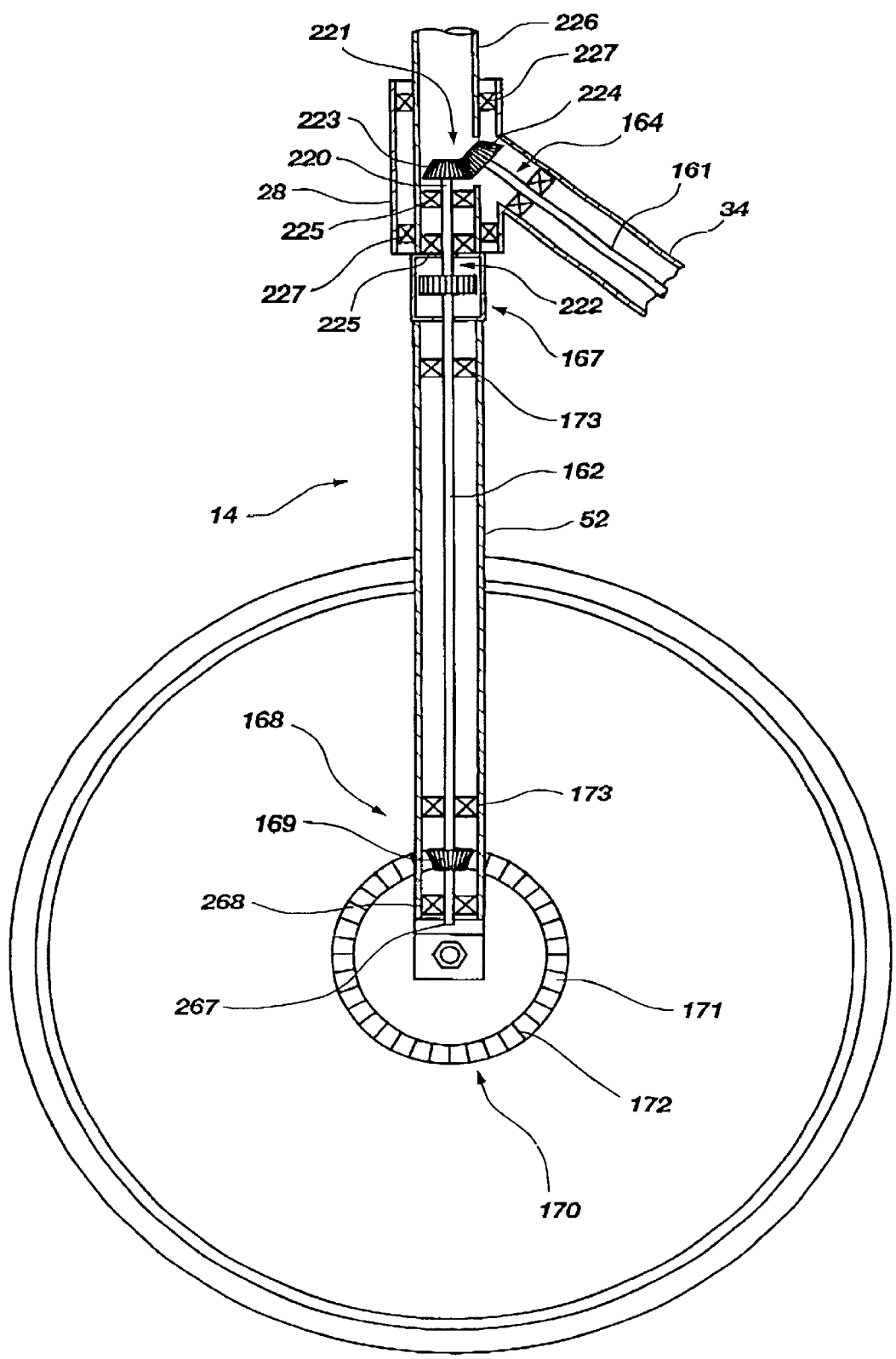
FIG. 4 is a side view of the front fork appearing in the embodiment illustrated in FIG. 1.
Figure 5:
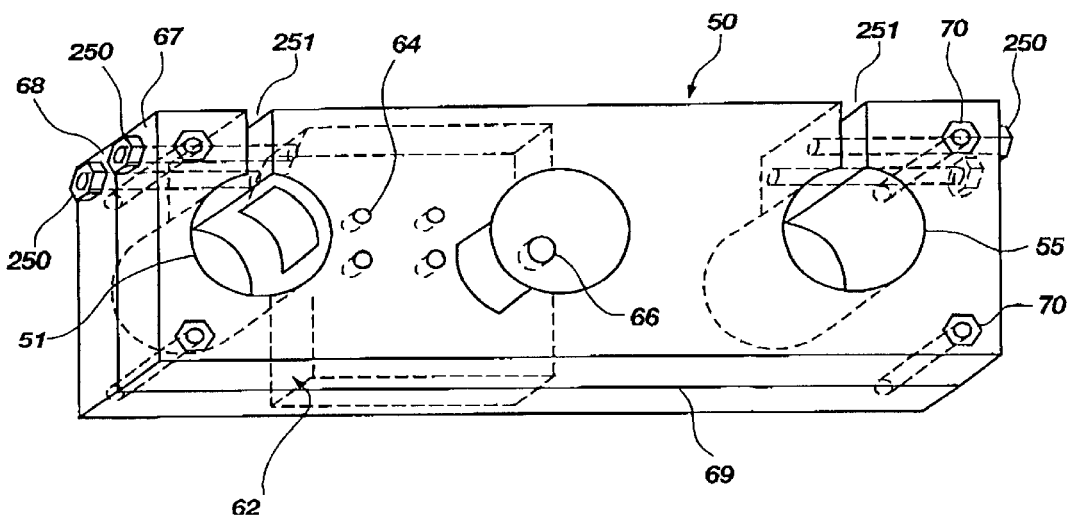
FIG. 5 is a perspective view of the triple clamp appearing in the embodiment illustrated in FIG. 1.
Figure 6:
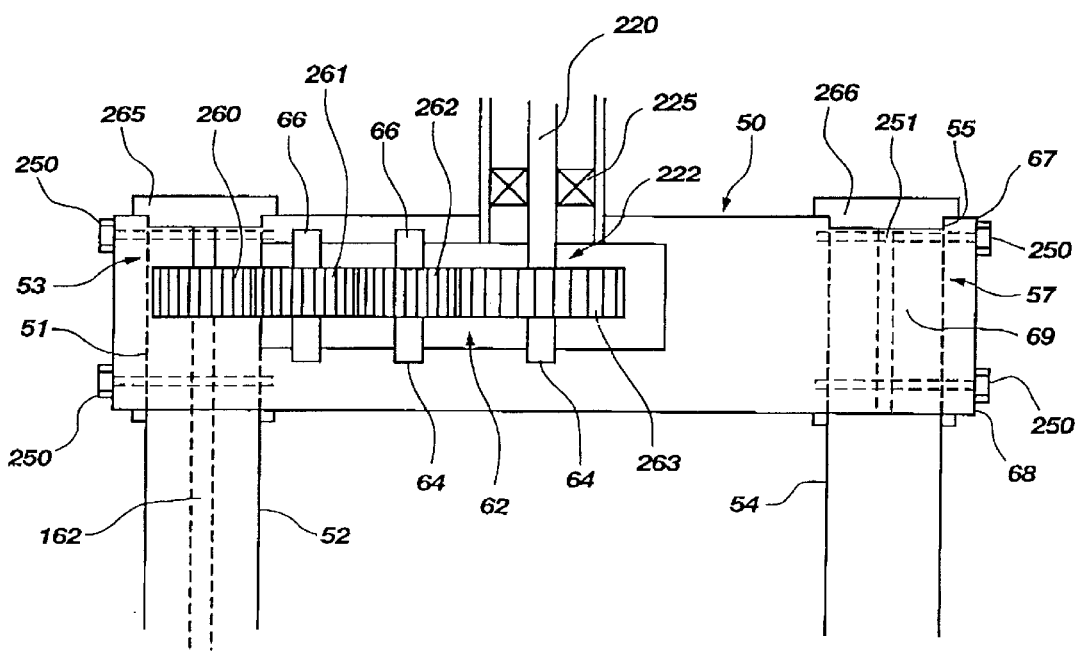
FIG. 6 is a front view of the triple clamp appearing in the embodiment illustrated in FIG. 1.

Referring to FIGS. 3–5, the front fork 14 is pivotally connected to the steering head 28 and functions, among other things, to steerably and rotatably connect the front wheel 16 to the main frame 12. The front fork 14 generally includes a triple clamp 50, a first fork tube 52 and a second fork tube 54. The first fork tube 52 has a first end 56 and a second end 58 and includes a hollow portion 60 that extends from the first end 56 to the second end 58. The hollow portion 60 is used to house components that comprise part of the front wheel drive means 22, as is discussed below.

The triple clamp 50 secures the first fork tube 52 and the second fork tube 54 to the main frame 12 and also houses a first set of spur gears 48 that comprise part of the front wheel drive means 22. The triple clamp 50 is preferably made of aluminum, but may be made of any other comparably high-strength and light-weight material. The triple clamp 50 has a hollow portion 62 that is sized and configured to house the first set of spur gears 48 therein. The triple clamp 50 also has a set of recess portions 64 that provide means with which to secure a set of shafts 66 upon which various ones of the first set of spur gears 48 are rotatably mounted. The triple clamp 50 is preferably constructed as a two-piece assembly, whereby an upper piece 67 and a lower piece 68 fit together at a parting line 69 and are secured together by bolts 70. The two-piece assembly allows the first set of spur gears 48 and related parts—e.g., bearings and bushings—that comprise part of the front wheel drive means 22 to be assembled inside of the triple clamp 50.

The first fork tube 52 and the second fork tube 54 are preferably hollow and constructed using standard light weight and high strength materials generally used to construct bicycle front forks, such as, for example, aluminum or titanium. The first fork tube 52 has an upper end 53 that extends through a first aperture 51 that is formed in the triple clamp 50. Similarly, the second fork tube 54 has an upper end 57 that extends through a second aperture 55 that is formed in the triple clamp 50. The upper ends 53, 57 of the first and second fork tubes 52, 54 are, preferably, press fit against both the upper piece 67 and the lower piece 68 of the triple clamp 50. The press fit for both tubes is accomplished using, for example, a pair of bolts 250 and a slit 251 that is machined from the upper and lower pieces 67, 68 of the triple clamp 50. Following positioning of the fork tubes in the apertures 51, 55, the bolts 250 are tightened, thereby locking the upper ends 53, 57 in place.

Figure 13:
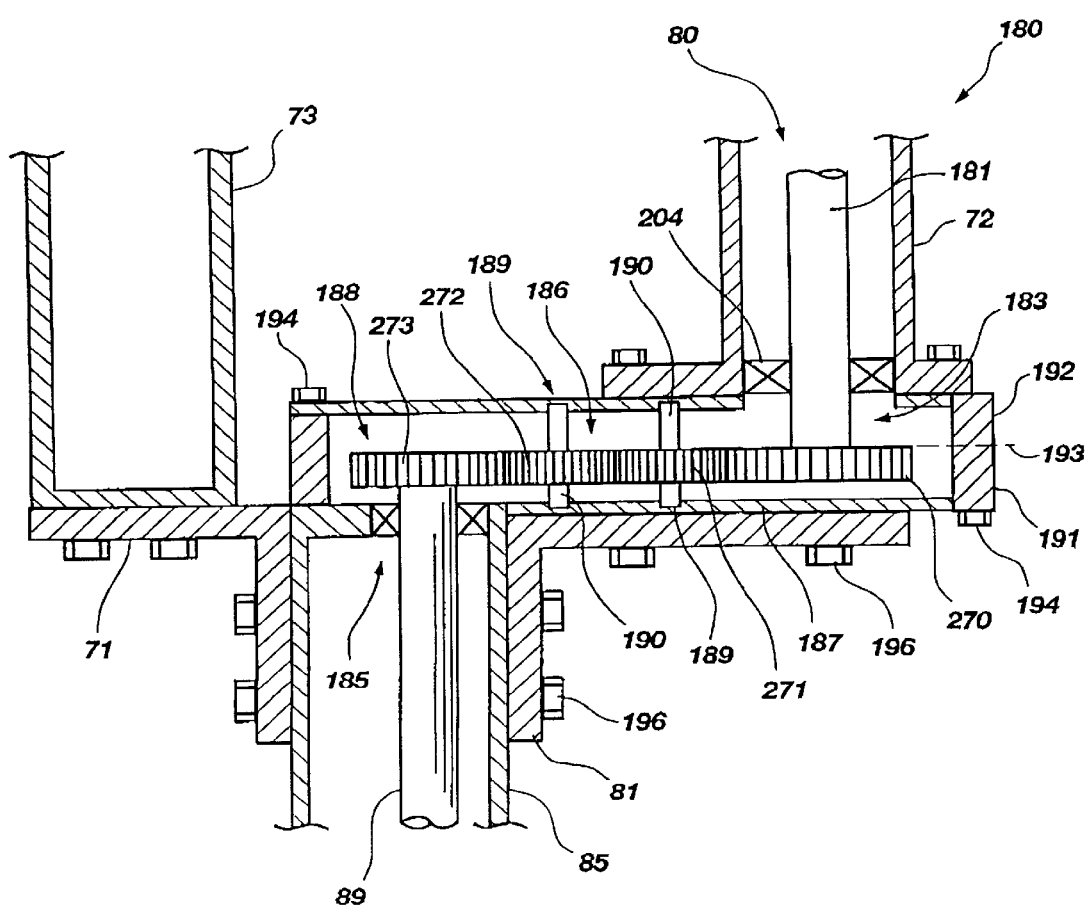
FIG. 13 is a cutaway view of the housing used in the rear wheel drive mechanism that appears in the embodiment illustrated in FIG. 1.
Figure 14:
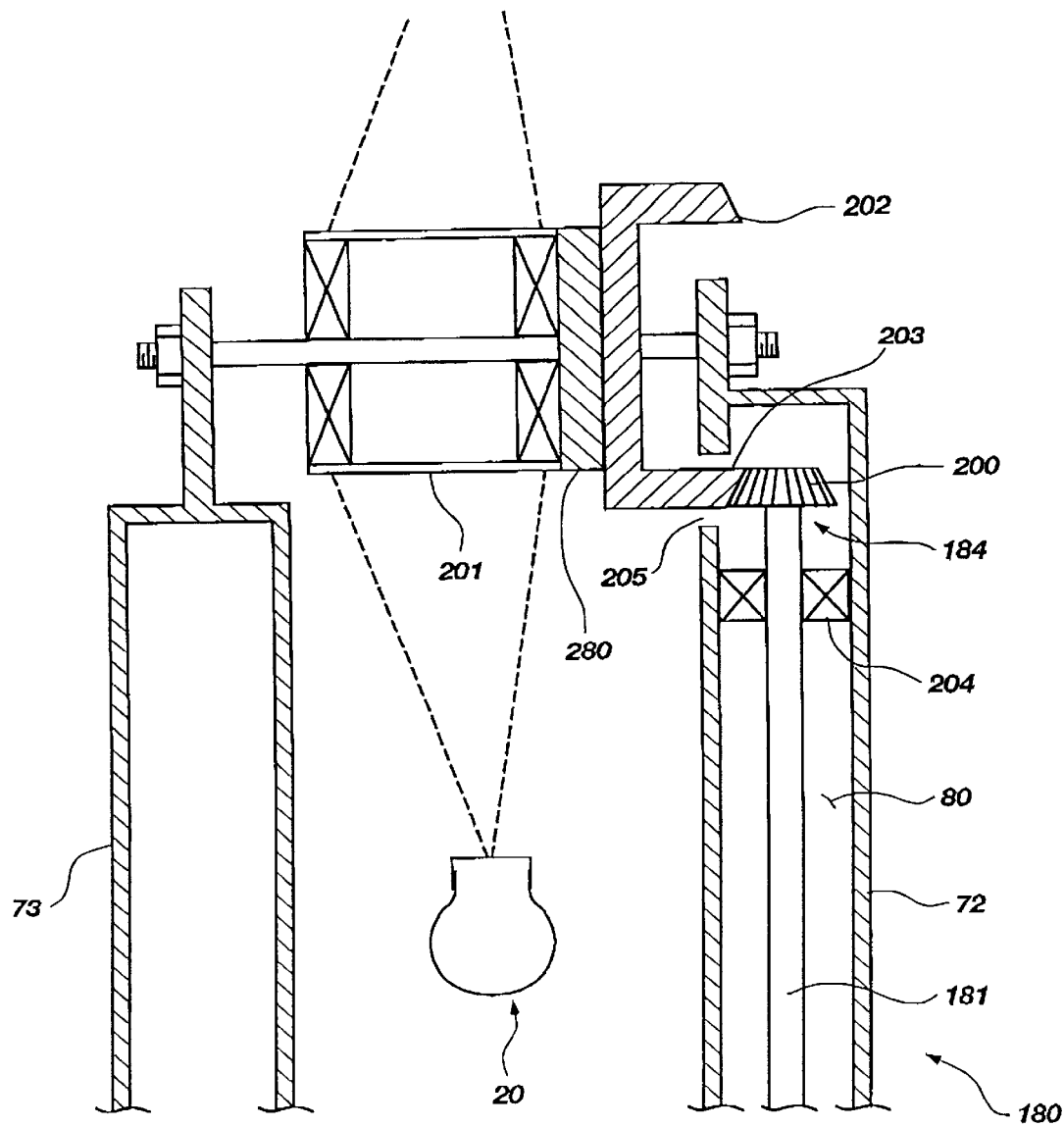
FIG. 14 is a cutaway view of a portion of the rear wheel drive mechanism used in the embodiment illustrated in FIG. 1.

Referring again to FIG. 1 and also to FIGS. 13 and 14, the rear frame 18 is connected to the main frame 12 and functions, among other things, to rotatably connect the rear wheel 20 to the main frame 12. The rear frame 18 generally includes a first chain stay 72, a second chain stay 73, a first seat stay 74 and a second seat stay 75. Each of the chain stays 72, 73 have first ends 76 and second ends 77, while each of the seat stays 74, 75 also have first ends 78 and second ends 79. The first chain stay 72 has a hollow portion 80 that extends from the first end 76 to the second end 77. The hollow portion 80 is used to house components of the rear wheel drive means 24, as is discussed below.

The seat stays 74, 75 are preferably constructed of aluminum, but may be constructed of other high-strength and low-weight materials that are typically used in constructing bicycle frames. The first ends 78 of the seat stays 74, 75 are secured to the seat tube 30 using, preferably, a bracket means 82. A bracket means 82 permits the rear frame 18 to be removed from the main frame 12 for repair or maintenance of the rear wheel drive means 22. The second ends 79 of the seat stays 74, 75 are connected to the second ends 77 of the chain stays 72, 73 through use of plate members 83, 84. The second ends 79 of the seat stays 74, 75 are preferably bolted to the plate members 83, 84 as are the second ends 77 of the chain stays 72, 73. Alternatively, the plate members 83, 84 may be welded to one of the second ends 79 of the seat stays 74, 75 and the second ends 77 of the chain stays 72, 73, while the other of the pair of second ends 77, 79 is bolted to the plate members 83, 84.

The chain stays 72, 73 are also preferably constructed of aluminum, but may be constructed of other high-strength and low-weight materials that are typically used in constructing bicycle frames. The first ends 76 of the chain stays 72, 73 are secured to the housing 85 using, preferably, a pair of bracket means 71, 81. The bracket means, 71, 81, together with the bracket means 82 above described with reference to the seat stays 74, 75 permit the rear frame 18 to be removed from the main frame 12 for repair or maintenance of the rear wheel drive means 22. The second ends 77 of the chain stays 72, 73 are secured to the plate members 83, 84 in a manner similar to that used to secure the seat stays 74, 75, that is, through bolts or by welding.

Referring now to FIGS. 1 and 2 and also to FIGS. 7–12, a main drive means 26 is connected to the main frame 12 and functions, among other things, to operate the front wheel drive means 22 and the rear wheel drive means 24, both of which are discussed below. The main drive means 26, preferably, includes a housing 85, a driving spindle 86, a plurality of driven ring gears 87, a first driven shaft 88 and a second driven shaft 89. In addition, a biasing means 92 biases the plurality of driven ring gears 87 away from the first driven shaft 88 and the second driven shaft 89, while a selective engagement means 94 selectively engages a select one of the plurality of driven ring gears 87 with the first driven shaft 88 and the second driven shaft 89. The main drive means 26 is operated by a user through a pair of foot pedals 90, which are themselves mounted to the driving spindle 86 through a pair of crank levers 91.

Figure 7:
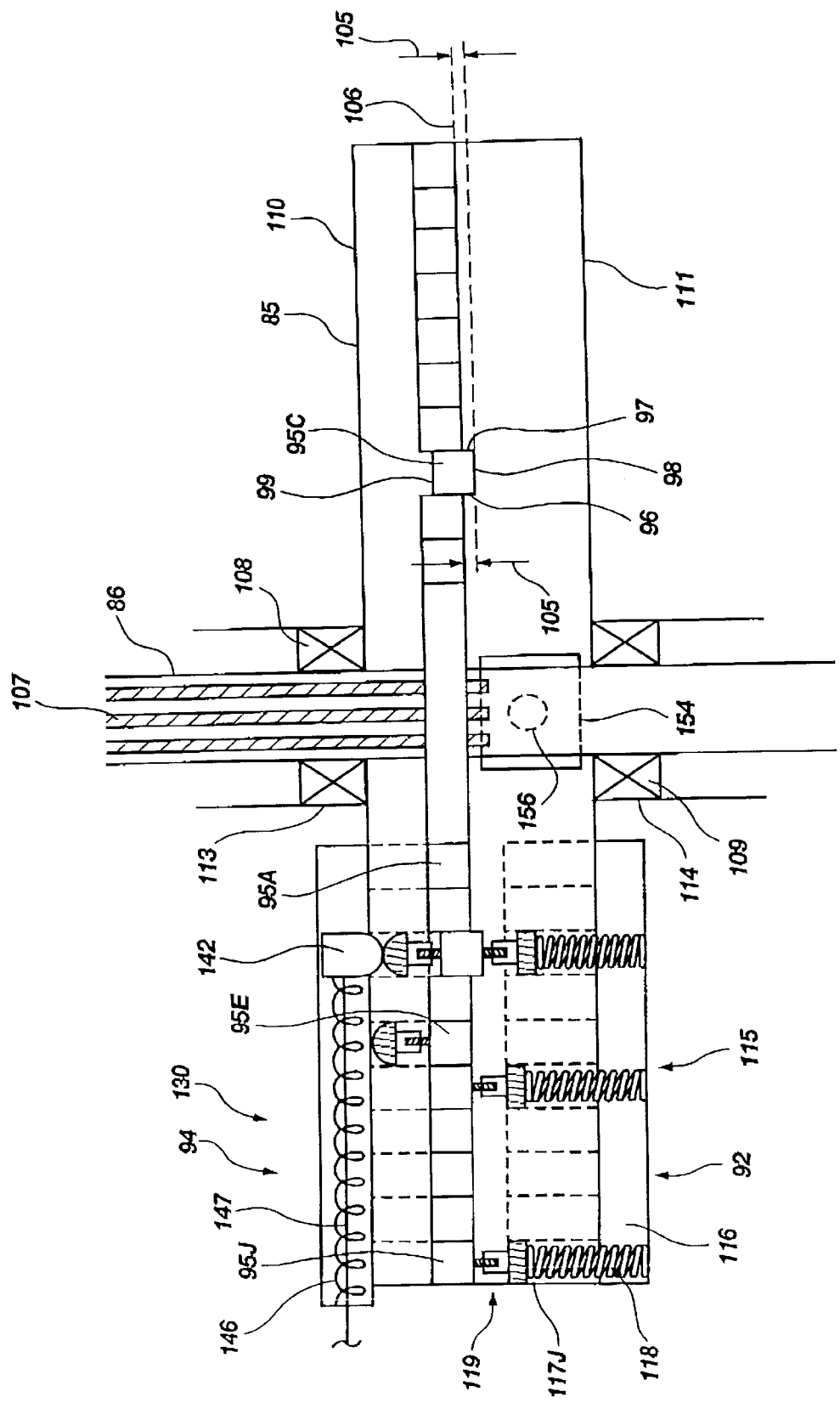
FIG. 7 is a cutaway view of the main drive mechanism taken along the line 7—7 shown in FIG. 1.
Figure 8:
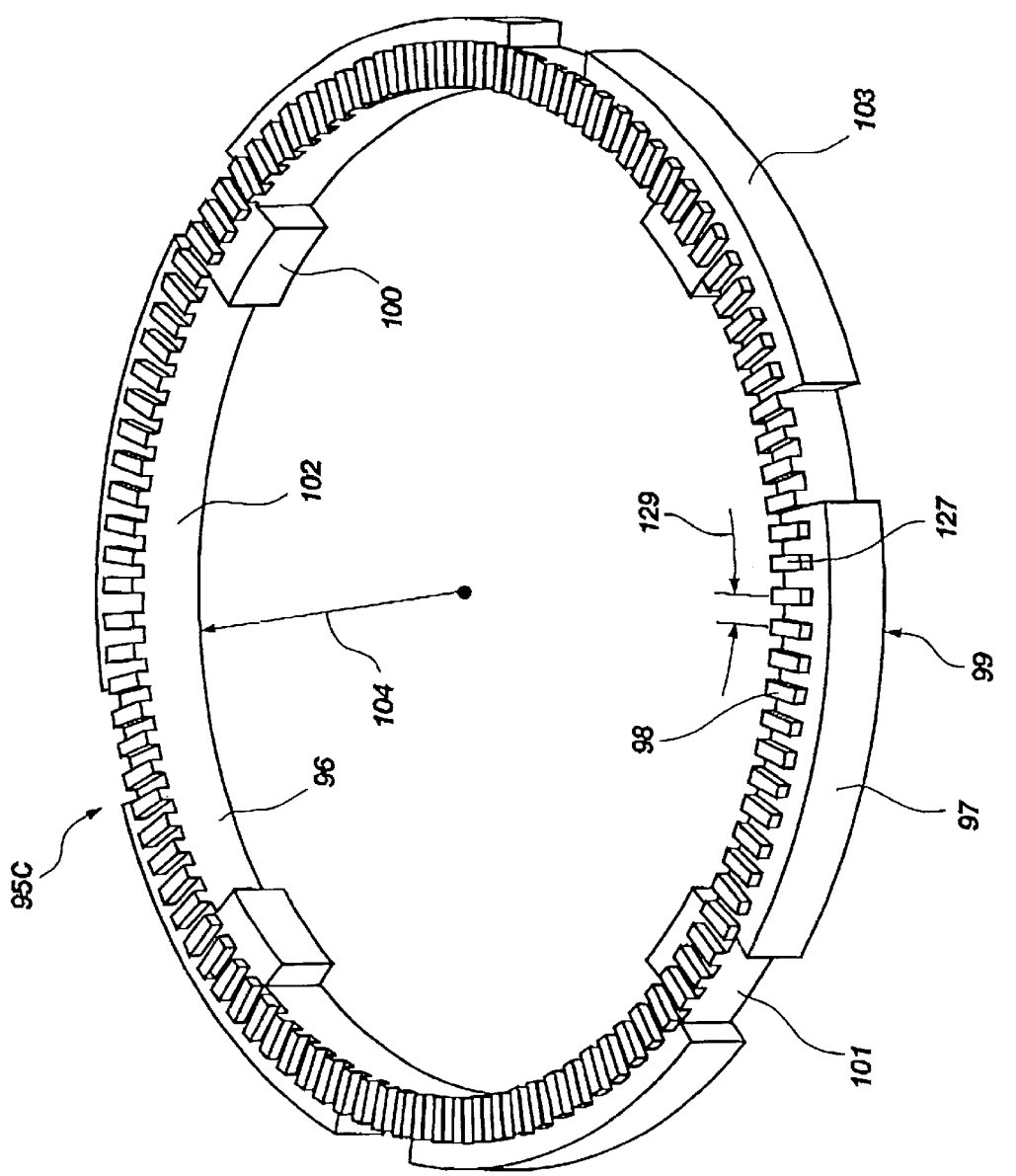
FIG. 8 is a perspective view of a driven ring gear.
Figure 9:
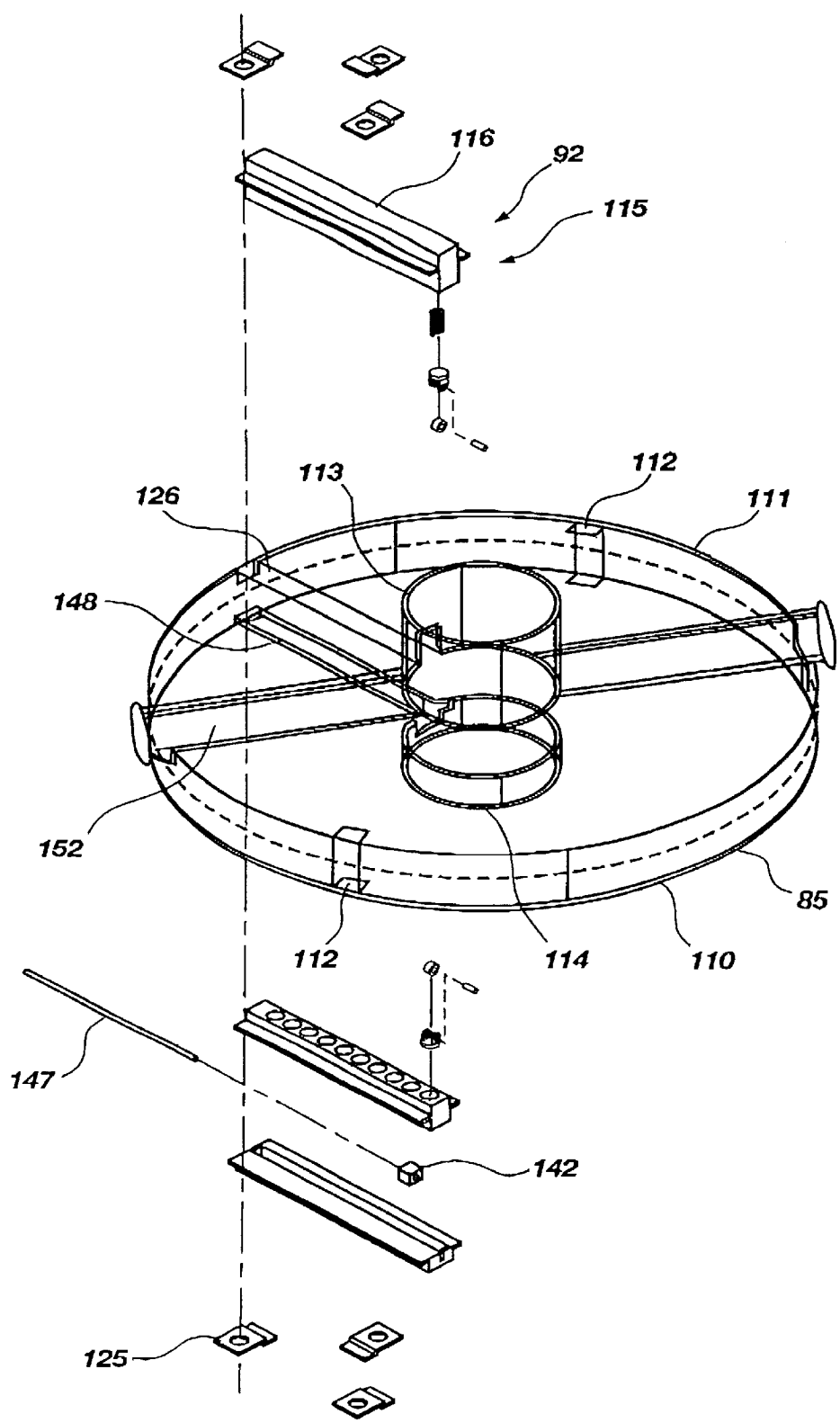
FIG. 9 is an exploded view of the housing for the main drive mechanism that appears in the embodiment illustrated in FIG. 1.
Figure 10:
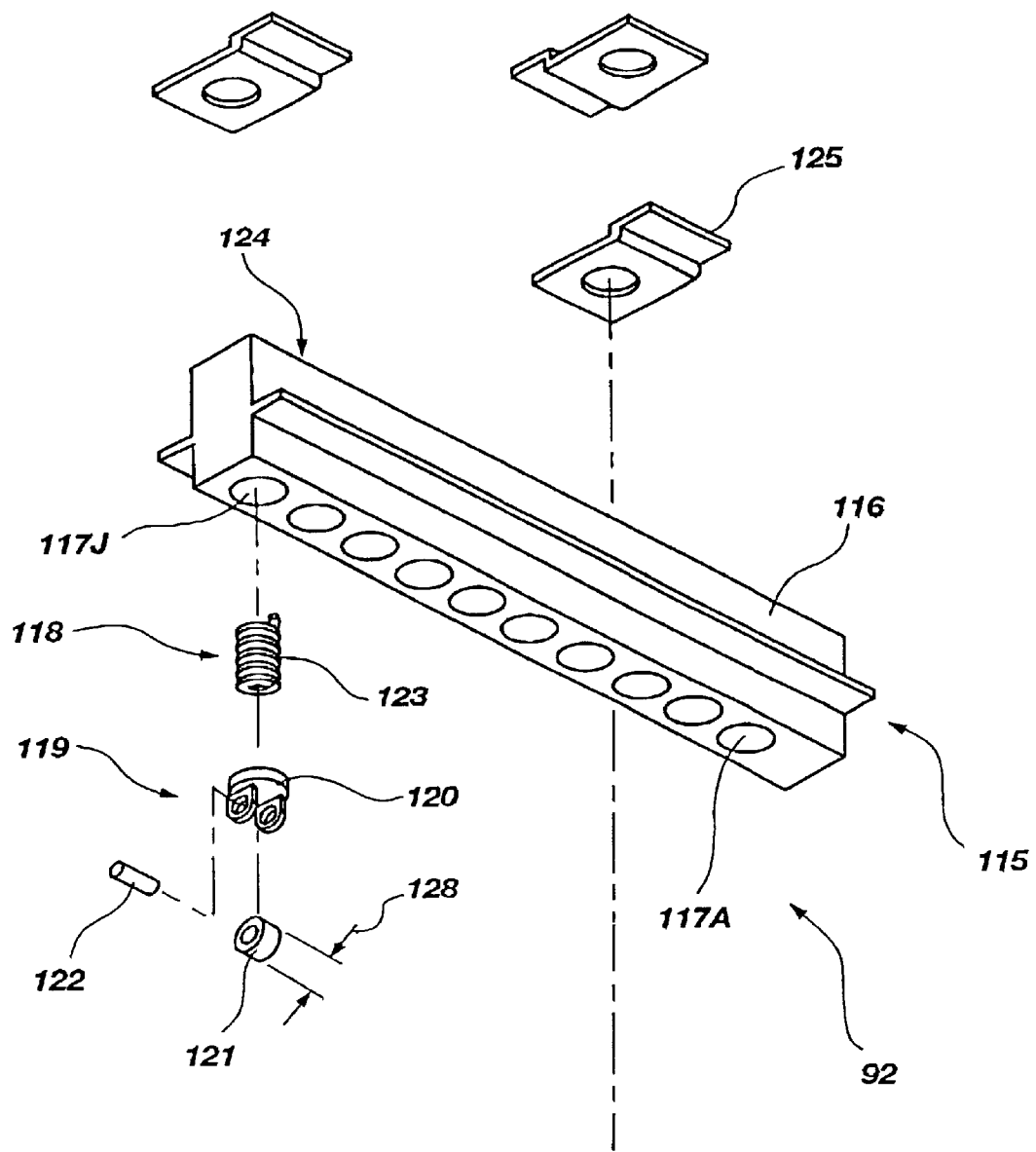
FIG. 10 is an exploded view of the biasing mechanism that appears in the embodiment illustrated in FIG. 1.
Figure 11:
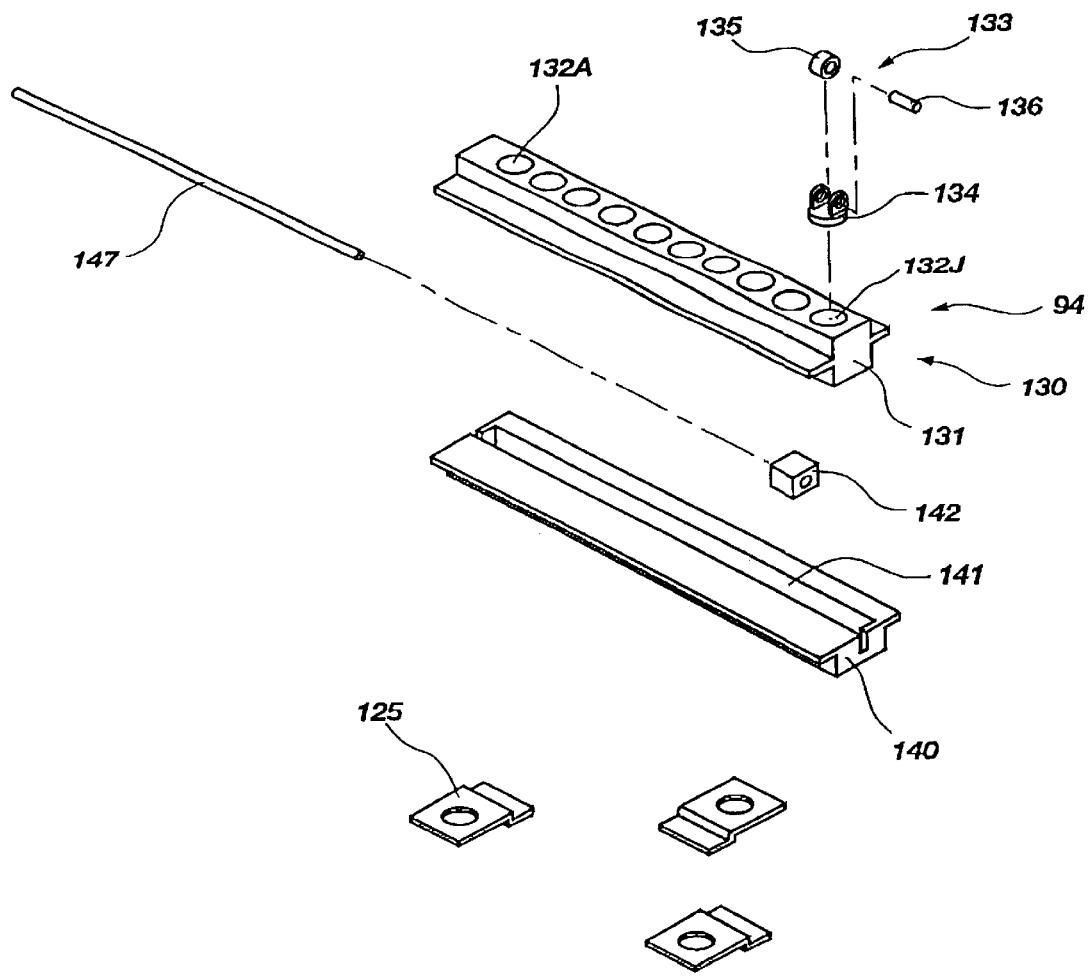
FIG. 11 is an exploded view of the selective engagement mechanism that appears in the embodiment illustrated in FIG. 1.
Figure 12:
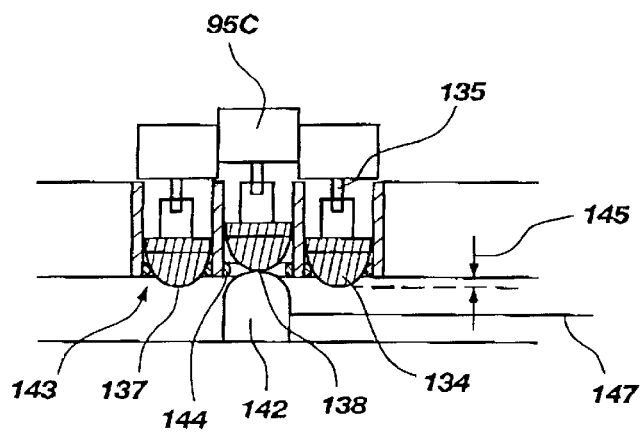
FIG. 12 is a close-up view of a portion of the selective engagement mechanism illustrated in FIG. 11.

More specifically, and by way of example, the main drive means 26 includes a series of ten driven ring gears 95A–95J. With reference to FIGS. 7 and 8, each driven ring gear—95C, for example—has an inner circumferential surface 96 and an outer circumferential surface 97 and a front surface 98 and a back surface 99. Spaced along the inner circumferental surface 96 and the outer circumferential surface 97 are a series of engaging teeth 100 and a series of engaging recesses 101, respectively. Each tooth of the series of engaging teeth 100 is sized and positioned to slidingly engage a corresponding recess on the outer circumferential surface of the immediately adjacent and smaller diameter driven ring gear (i.e., ring gear 95B). Similarly, each recess of the of the series of engaging recesses 101 is sized and positioned to slidingly engage a corresponding tooth on the inner circumferential surface of the immediately adjacent and larger diameter driven ring gear (i.e., ring gear 95D). Furthermore, the constant radius portions 102, 103 of the inner circumferential surface 96 and the outer circumferential surface 97 are sized in radius 104 to slidingly engage the corresponding constant radius portions of the adjacent ring gears.

When each one of the plurality of driven ring gears 87—e.g., the series of ten driven ring gears 95A–95J—is sized and configured in the fashion above described, a cluster of ring gears results whereby any one of the cluster may be setoff a small distance 105 from a bias plane 106 that the front surface 98 of each of the remaining gears otherwise resides. As explained below, this feature permits the selective engagement means 94 to displace a select ring gear—e.g., ring gear 95C—a small distance 105 from its otherwise biased position so that the select ring gear engages both the first driven shaft 88 and the second driven shaft 89. An inter-gear tolerance—i.e., the spacing between the inner circumferential surface and the outer circumferential surface of adjacent gears—of about one one-hundredth (1/100) of an inch to about twenty one-hundredths (20/100) of an inch is believed to enable a single set of biasing means 92 and selective engagement means 94 to displace a select ring gear the small distance 105 without binding against adjacent gears. Otherwise, a second set of biasing means and selective engagement means may be positioned on the opposite side of the housing (that is, spaced 180 degrees from the biasing means 92 and the selective engagement means 94) in a manner similar to that described above.

The series of ten driven ring gears 95A–95J are assembled consistent with the foregoing discussion. More specifically, the driven ring gear having the smallest radius 104—i.e., ring gear 95A—is slidingly engaged with the driving spindle 86. The driving spindle 86 has a series of engaging recesses 107 that are sized and positioned to correspond with the series of engaging teeth 100 that reside on the inner circumferential surface 96 of the ring gear having the smallest radius 104—i.e., ring gear 95A. The ring gear having the next largest radius 104—i.e., ring gear 95B—is then positioned about the former ring gear, with the process being repeated until the ring gear having the largest radius 104—i.e., ring gear 95J—is placed on the cluster.

A first driving spindle bearing 108 and a second driving spindle bearing 109 rotatably secure the driving spindle 86 is the housing 85. The first and second spindle bearings 108, 109 are preferably press fit onto the driving spindle 86 as well as into first and second bearing recesses 113, 114 of the housing 85. The housing 85 is itself preferably formed by joining a first housing section 110 and a second housing section 111 together. Dividing the housing 85 into first and second housing sections 110, 111 facilitates assembly and disassembly of the main drive means 26. The first and second housing sections 110, 111 may be held together using any suitable means, such as clamp members 112.

Referring to FIGS. 7–10, a biasing means 92—e.g., biasing mechanism 115—includes structure whose function is to bias the plurality of driven ring gears 87 a short distance (on the order of one-sixteenth of an inch) away from the first driven shaft 88 and the second driven shaft 89. A preferred embodiment of the biasing means 92 includes a housing member 116 having a plurality of guide tubes (or recesses) 117A–117J formed therein. Slidably engaged with each individual guide tube—e.g., guide tube 117J—is a spring means 118 and a roller means 119. The spring means 118 biases the roller means 119 against a corresponding driven ring gear—e.g., ring gear 95J—and hence biases the driven ring gear 95J away from the first and second driven shafts 88, 89. The roller means 119 includes, for example, a base member 120, a roller 121 and a roller shaft 122. The spring means 118—e.g., coil spring 123—has for reaction surfaces the back side 124 of the housing member 116 and the base member 120. The housing member 116 is secured to the housing 85 using clamp members 125, which are themselves secured to the housing 85 using any suitable means, such as by bolts (not shown). A recess 126 is formed in the housing 85 and provides means by which the housing member 116 may be held securely to the housing 85 and protrude through the wall of the second housing section 111.

With the biasing means 92—e.g., biasing mechanism 115—assembled in this fashion, the roller 121 is continually held in contact with its corresponding driven ring gear—e.g., ring gear 95J. Preferably, the roller 121 is sized to roll over the individual teeth 127 that reside on the front surface 98 of the ring gear, meaning that the outer diameter 128 of the roller 121 should be at least as large as the distance 129 between the centers of adjacent teeth 127. Alternatively, a groove (not illustrated) may be machined through the center of each of the individual teeth 127 such that the roller 121 makes smooth contact against a flat surface on the front surface 98 of the ring gear, rather than against the individual teeth 127.

Referring to FIGS. 7–12, a selective engagement means 94—e.g., selective engagement mechanism 130—includes structure whose function is to selectively engage a select one of the plurality of driven ring gears 87 with the first driven shaft 88 and the second driven shaft 89. A preferred embodiment of the selective engagement means 94 includes a housing member 131 having a plurality of guide tubes (or recesses) 132A–132J formed therein. A second housing member 140 has a track 141 formed therein that is sized and configured to permit slidable engagement of a cam member 142 therewith.

Slidably engaged with each individual guide tube—e.g., guide tube 132J—is a roller means 133. The roller means 133 includes, for example, a base member 134, a roller 135 and a roller shaft 136. The base member 134 includes a rounded portion 137 that is sized and configured to make sliding contact with a similarly rounded portion 138 of the cam member 142. At the periphery 143 of each guide tube 132 is a protuberance 144 that functions to maintain each base member 134 inside its individual guide tube 132. The distance 145 that each base member 132 extends beyond the periphery 143 is essentially equal to the setoff distance 105, after making allowances for tolerances among the various components of the biasing means 92 and the selective engagement means 94. The housing member 131 is positioned adjacent the second housing member 140 and the combination is secured to the housing 85 using clamp members 125, which are themselves secured to the housing 85 using any suitable means, such as by bolts (not shown). A recess 148 is formed in the housing 85 and provides means by which the housing member 131, 140 may be held securely to the housing 85 and protrude through the wall of the first housing section 110.

With the selective engagement means 94—e.g., selective engagement mechanism 130—assembled in this fashion, each roller 135 is held adjacent its corresponding driven ring gear—e.g., ring gear 95E. Preferably, each roller 135 is sized and configured to roll over the back surface 99 of its corresponding ring gear. The cam member 142 is moved along the track 141 by, for example, a cable 147, which is itself connected to a shifting mechanism (not illustrated), such as a ratchet shifter. The shifting mechanism operates to incrementally slide the cam member 142 along the track 141 through movement of the cable 147. At each increment, the shift mechanism positions the cam member 142 immediately adjacent a base member 134 that itself corresponds with a select driven ring gear—e.g., driven ring gear 95C. The cam member 142 will force the base member 134 a distance 145 into the guide tube 132, which distance is sufficient to engage the select driven ring gear with the first and second driven shafts 88, 89. In other words, the cam member 142 forces the teeth on the select ring gear—e.g., ring gear 95C—into engagement with the corresponding teeth (or splines) on the first and second driven shafts 88, 89. In this manner, the select ring gear is said to be selectively engaged with the first and second driven shafts. The cam member 142 is biased by a spring means—such as, for example, coil spring 146—so that the cam member 142 will be biased toward one end of the track 141 upon release of the ratchet shifting mechanism. In other words, the coil spring 146 serves a similar function to that provided by the coil springs that serve to bias the front and rear chain derailleur mechanisms that are found on typical multi-speed bicycles.

Referring again to FIGS. 2, 7 and 9, the first and second driven shafts 88, 89 are rotatably mounted in the housing 85 and function to transfer torque supplied by the rider to the driving spindle 86 to the front wheel and rear wheel driving means 22, 24. For example, the first driven shaft 88 has a first end 150 that is rotatably secured in the housing 85 by a bearing 151 that is itself press fit onto the first driven shaft 88 proximate its first end 150. The bearing 151 is secured to the housing 85 by a recess portion 152 that is formed in the housing 85. The first driven shaft 88 has a second end 153 that extends away from the first end 150 and toward the driving spindle 86. The second end 153 has a reduced diameter portion 155 that is sized and configured to fit into a recess 156 that resides in a sleeve 154 that fits over the driving spindle 86. A second bearing 157 is fit into the recess 156 and functions to rotatably secure the second end 153 of the first driven shaft 88. The second driven shaft 89 is rotatably secured to and within the housing 85 is a similar fashion as that used to rotatably secure the first driven shaft 88 to and within the housing 85. It is noted that when the first and second driven shafts 88, 89 are so secured, the bias plane 106 in which the front surface 98 of each of the plurality of driven ring gears 87 resides is located approximately the setoff distance 105 away from driving splines 158 that are cut into the first and second driven shafts 88, 89. The driving splines 158 extend the length of the first and second driven shafts 88, 89 and are sized and configured to engage each one of the plurality of driven ring gears 87.

With the main driving means constructed and assembled as above described, the first and second driven shafts 88, 89 rotate upon rotation of the driving spindle 86 by a user. The biasing means 92, operating in conjunction with the selective engagement means 94, ensure that a select one of the plurality of driven ring gears 87 will be in mechanical engagement with the first and second driven shafts 88, 89 at any particular time. Different gearing rations are obtainable by selecting a different one of the plurality of driven ring gears 87 to engage the first and second driven shafts 88, 89. For example, a relatively low-torque, but high-speed gear ratio is obtained by selecting the largest diameter ring gear—i.e., ring gear 95J—as opposed to the smallest diameter ring gear—i.e., ring gear 95A, which will produce the highest torque, but lowest speed gear ratio. This is similar to the operation of typical multi-speed bicycles wherein the largest diameter gear of the front set of gears (i.e., the set of gears driven by the pedals) is used to produce the highest speeds (but lowest torque) and the smallest diameter gear of the front set of gears is used to produce the lowest speed (but highest torque).

Referring to FIGS. 3–6, the front wheel drive means 22 functions to rotatably drive the front wheel 16. A preferred embodiment of the front wheel drive means 22—e.g., front wheel drive mechanism 160—includes a first shaft means 161 and a second shaft means 162, together with an intermediate shaft 220 and a first set of spur gears 48. The first shaft means 161 has a first end 163 and a second end 164. The first end 163 is operably coupled to the first end 150 of the first driven shaft 88. The term "operably coupled" herein above and below refers interchangeably to "shaft-to-shaft" or to "shaft-to-wheel" couplings—using shafts, gears, universal joints and the like—whereby rotation of a driving shaft produces rotation of a driven shaft or wheel.

A preferred means of operably coupling the first end 163 of the first shaft means 161 to the first end 150 of the first driven shaft 88 is accomplished with a universal joint 165. The universal joint 165 has female spline structure at both ends (not illustrated) that engage corresponding male spline structure that is formed at the ends of the first driven shaft 88 and the first shaft means 161. Use of a universal joint 165 permits transmission of rotary torque from the first driven shaft 88 to the first shaft means 161. The first shaft means 161 is preferably housed in the downtube 34. A pair of bearings 166 are positioned between the outer diameter of the first shaft means 161 and the inner diameter of the downtube 34 and enable the first shaft means 161 to rotate within the downtube 34.

The second shaft means 162 has a first end 167 and a second end 168. The first end 167 is operably coupled to the second end 164 of the first shaft means 161, as is discussed below. The second end 168 is operably coupled to the front wheel 16 through use of, preferably, a driving bevel gear 169 mounted on the second end 168 of the second shaft means 162. The driving bevel gear 169 engages a driven bevel gear 171 that is itself connected to a hub 170. The driven bevel gear 171 has a raised portion 172 upon which the gear teeth (not referenced) are located. The second shaft means 162 extends through the hollow portion of the first fork tube 52 and is rotatably mounted therein using a pair of bearings 173. An aperture 174 is formed through the first fork tube 52 at a location proximate the location of the driving bevel gear 169 and enables engagement of the driving bevel gear 169 with the driven bevel gear 171. The raised portion 172 of the driven bevel gear 171 extends, for example, through the aperture 174 to engage the driving bevel gear 169 mounted on the second shaft means 162. The rim, tire and spokes of the front wheel 16 are all otherwise connected to the hub 170 in typical fashion.

Referring to FIGS. 3–5, the first end 167 of the second shaft means 162 is operably coupled to the second end 164 of the first shaft means 161 through use, preferably, of an intermediate shaft means 220 that extends through a portion of the steering head 28 together with the previously referenced first set of spur gears 48. More specifically, the intermediate shaft means 220 has a first end 221 and a second end 222. The first end 221 is operably coupled to the second end 164 of the first shaft means 161 through use, preferably, of a driven bevel gear 223 mounted on the first end 221 of the intermediate shaft means 220. The driven bevel gear 223 engages a driving bevel gear 224 mounted on the second end 164 of the first shaft means 161. The driven bevel gear 223 and the driving bevel gear 224 are mounted on and engage the ends of their respective shaft means 220, 161 using typical mounting and engaging means, such as, for example, spline fits (not referenced).

The second end 222 of the intermediate shaft means 220 is operably coupled to the first end 167 of the second shaft means 162 through use of the first set of spur gears 48. Preferably, the first set of spur gears 48 includes four individual gears 260–263. The center pair of spur gears 261, 262 rotate on corresponding shafts 66 whose ends are positioned in the recess portions 64 of the triple clamp 50. Bearing means, such as, for example, roller bearings (not illustrated or referenced), are positioned between each one of the center pair of spur gears 261, 262 and their corresponding shaft 66. The driving spur gear 263 is secured to the second end 222 of the intermediate shaft means 220 using, for example, a spline fit (not referenced). Rotation of the driving spur gear 263 causes the center pair of spur gears 261, 262 to rotate and, in turn, causes the driven spur gear 260 to rotate. The driven spur gear 260 is secured to the first end 167 of the second shaft means 162 using, for example, a spline fit (not referenced). The first end 167 of the second shaft means 162 extends into an aperture or recess that itself extends into the fork tube cap 265. Similarly, the second end 168 of the second shaft means 162 extends into an aperture or recess 267 that extends into the bottom of the first fork tube 52 or, alternatively or in conjunction therewith, a bearing 268 is positioned at a location below the driving bevel gear 169.

The intermediate shaft means 220 is rotatably mounted in a fork stem 226 using a pair of bearings 225. The fork stem 226 is itself secured to the triple clamp 50 using standard techniques known to those skilled in the art, such as, for example, by press fit or by welding (not illustrated) The fork stem 226 is also pivotally mounted to the steering head 28 using a second set of bearings 227. An aperture 228 is provided in the fork stem 226 to permit the driving bevel gear 224 to engage the driven bevel gear 223. The handle bars of the bicycle are connected to the upper end of the fork stem 226 using standard techniques.

With the front wheel drive means 22—i.e., front wheel drive mechanism 160—constructed as above described, driven rotation of the front wheel 16 results from driving rotation of the first driven shaft 88 which, as described above with respect to the main drive means 26, is driven by rotation of the driving spindle 86 (and which is driven by the pedals 90). Of course, driving rotation of the front wheel 16 would produce driven rotation of the first driven shaft 88, which is undesirable as the bicycle would not be able to "coast" without the pedals 90 turning in response. Thus, a one-way clutch means is positioned at some point along the set of component parts that make up the front wheel drive means 22. Preferably, a one-way clutch means—e.g., a ratchet and ball bearing or roller type freewheel mechanism 270—is positioned between the driven bevel gear 171 and the hub 170. Alternatively, the one-way clutch means may be positioned between the first driven shaft 88 and its corresponding universal joint 150. The preferable approach, however, is to position the one-way clutch between the driven bevel gear 171 and the hub 170, as such will eliminate rotation of the various components of the front wheel drive means 22 during coasting. Such use of ratchet and ball bearing or roller type freewheel mechanisms is known in the art and is described variously in U.S. Pat. No. 479,470 (Smallwood), U.S. Pat. No. 4,943,077 (Lin et al.), U.S. Pat. No. 5,184,838 (Becoat), U.S. Pat. No. 5,299,819 (Leu) and U.S. Pat. No. 6,095,540 (Kim), the disclosure of which patents is incorporated by reference.

The rear wheel drive means 24 functions to rotatably drive the rear wheel 20. Referring to FIGS. 2, 13 and 14, a preferred embodiment of the rear wheel drive means 24—e.g., rear wheel drive mechanism 180—includes a third shaft means 181, together with a second set of spur gears 186. The third shaft means 181 has a first end 183 and a second end 184. The first end 183 is operably coupled to the first end 185 of the second driven shaft 89 while the second end 184 is operably coupled to the rear wheel 20. The third shaft means 181 is rotatably housed within the hollow portion 80 of the first chain stay 72.

Referring to FIG. 13, a preferred approach to operably coupling the first end 183 of the third shaft means 181 to the first end 185 of the second driven shaft 89 is through use of a second set of spur gears 186 that are mounted within a housing 187. The housing 187 is constructed similarly to the triple clamp 50. More specifically, a hollow portion 188 is sized and configured to permit the second set of spur gears 186 to be housed therein. The housing 187 has recess portions 189 that secure the individual shafts 190 upon which certain ones of the second set of gears 186 rotate. The housing 187 is preferably constructed as a two-piece assembly, whereby a first piece 191 and a second piece 192 join together at a parting line 193 and are held together by bolts 194. The two-piece assembly allows the second set of gears 186 and related parts—e.g., bearings and bushing—to be assembled and disassembled. The housing 187, following assembly, is then secured to the housing 85 of the main drive means 26 through use of a bracket 195 and bolts 196.

Preferably, the second set of spur gears 186 includes four individual gears 270–273. The center pair of spur gears 271, 272 rotate on corresponding shafts 190 whose ends are positioned in the recess portions 189 of the housing 187. Bearing means, such as, for example, roller bearings (not illustrated or referenced), are positioned between each one of the center pair of spur gears 271, 272 and their corresponding shaft 190. The driving spur gear 273 is secured to the first end 185 of the second driven shaft 89 using, for example, a spline fit (not referenced). Rotation of the driving spur gear 273 causes the center pair of spur gears 271, 272 to rotate and, in turn, causes the driven spur gear 270 to rotate. The driven spur gear 270 is secured to the first end 183 of the third shaft means 181 using, for example, a spline fit (not referenced).

The second end 184 of the third shaft means 181 is operably coupled to the rear wheel 20 through, preferably, a driving bevel gear 200 mounted on the second end 184 of the third shaft means 181. The driving bevel gear 200 engages a driven bevel gear 202 that is itself connected to a hub 201.

The driven bevel gear 202 has a raised portion 203 upon which the gear teeth (not referenced) are located. The third shaft means 181 extends through the hollow portion 80 of the first chain stay 72 and is rotatably mounted therein using a pair of bearings 204. An aperture 205 is formed in the first chain stay 72 proximate the location of the driven bevel gear 200 and enables engagement of the driving bevel gear 200 and the driven bevel gear 202. The raised portion 203 of the driven bevel gear 202 extends, for example, through the aperture 205 to engage the driving bevel gear 200 mounted on the second shaft means 181. The rim, tire and spokes of the rear wheel 20 are all otherwise connected to the hub 201 in typical fashion.

As with the front wheel drive means 22 above described, driven rotation of the rear wheel 20 results from driving rotation of the second driven shaft 89 which, as described above with respect to the main drive means 26, is driven by rotation of the driving spindle 86 (and which is driven by the pedals 90). Of course, driving rotation of the rear wheel 20 would produce driven rotation of the second driven shaft 89 in a similar manner to that described above with respect to the front wheel 16 and the first driven shaft 88, which is likewise undesirable as the bicycle would not be able to "coast" without the pedals 90 turning also. Thus, a one-way clutch means is also positioned at some point along the set of component parts that make up the rear wheel drive means 24. Preferably, a one-way clutch means—e.g., a ratchet and ball bearing type freewheel mechanism 280—is positioned between the driven bevel gear 202 and the hub 201. Alternatively, the one-way clutch means may be positioned between the second driven shaft 89 and its corresponding driving spur gear 273. The preferable approach, however, is to position the one-way clutch between the driven bevel gear 202 and the hub 201 in a fashion similar to that described previously with respect to the front wheel 16, as such will eliminate rotation of the various components of the rear wheel drive means 24 during coasting.

Figure 15:
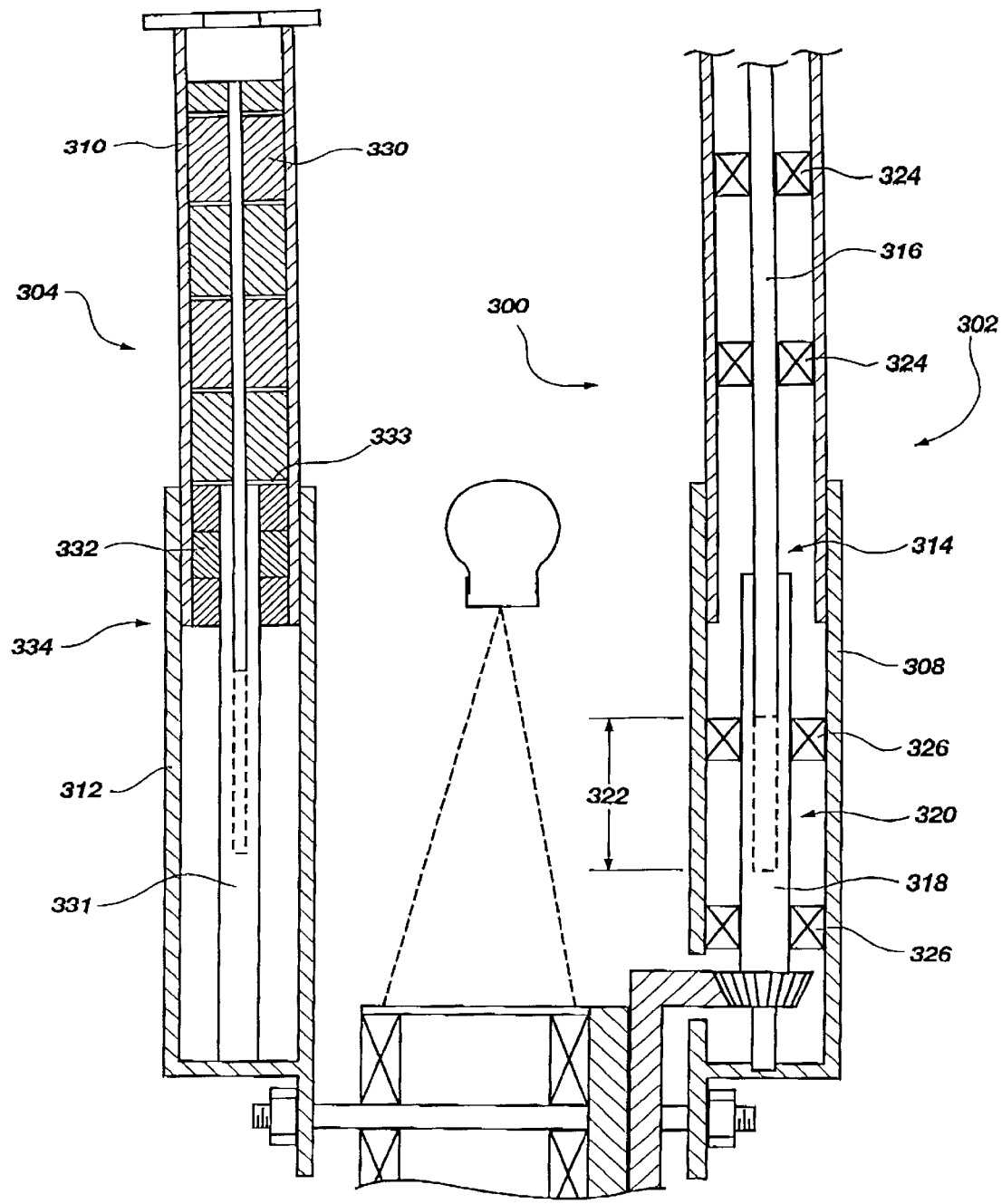
FIG. 15 is a front view of a shock absorbing front fork.
Figure 16:
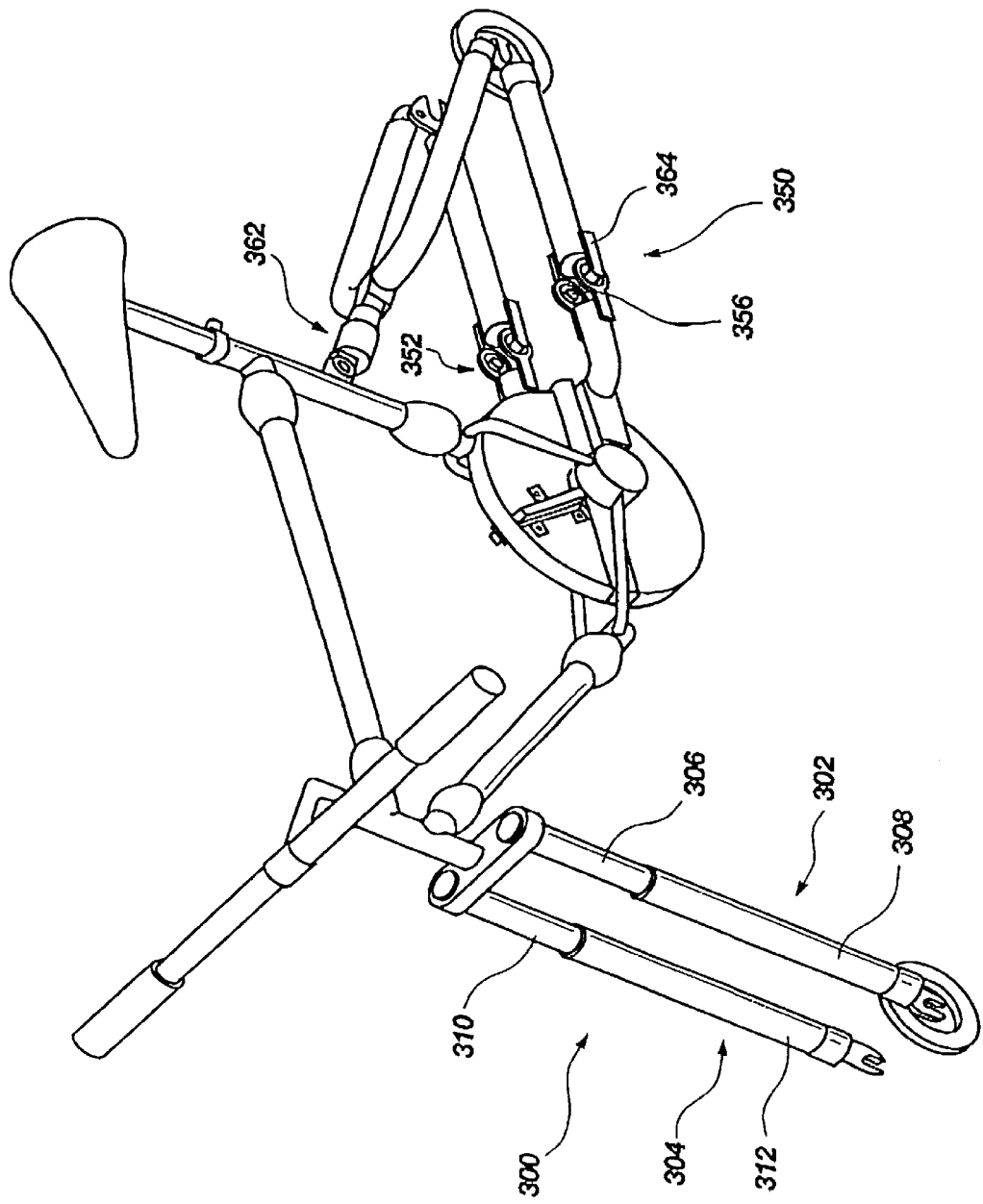
FIG. 16 is a perspective view illustrating a full-suspension embodiment of the present invention.
Figure 17:
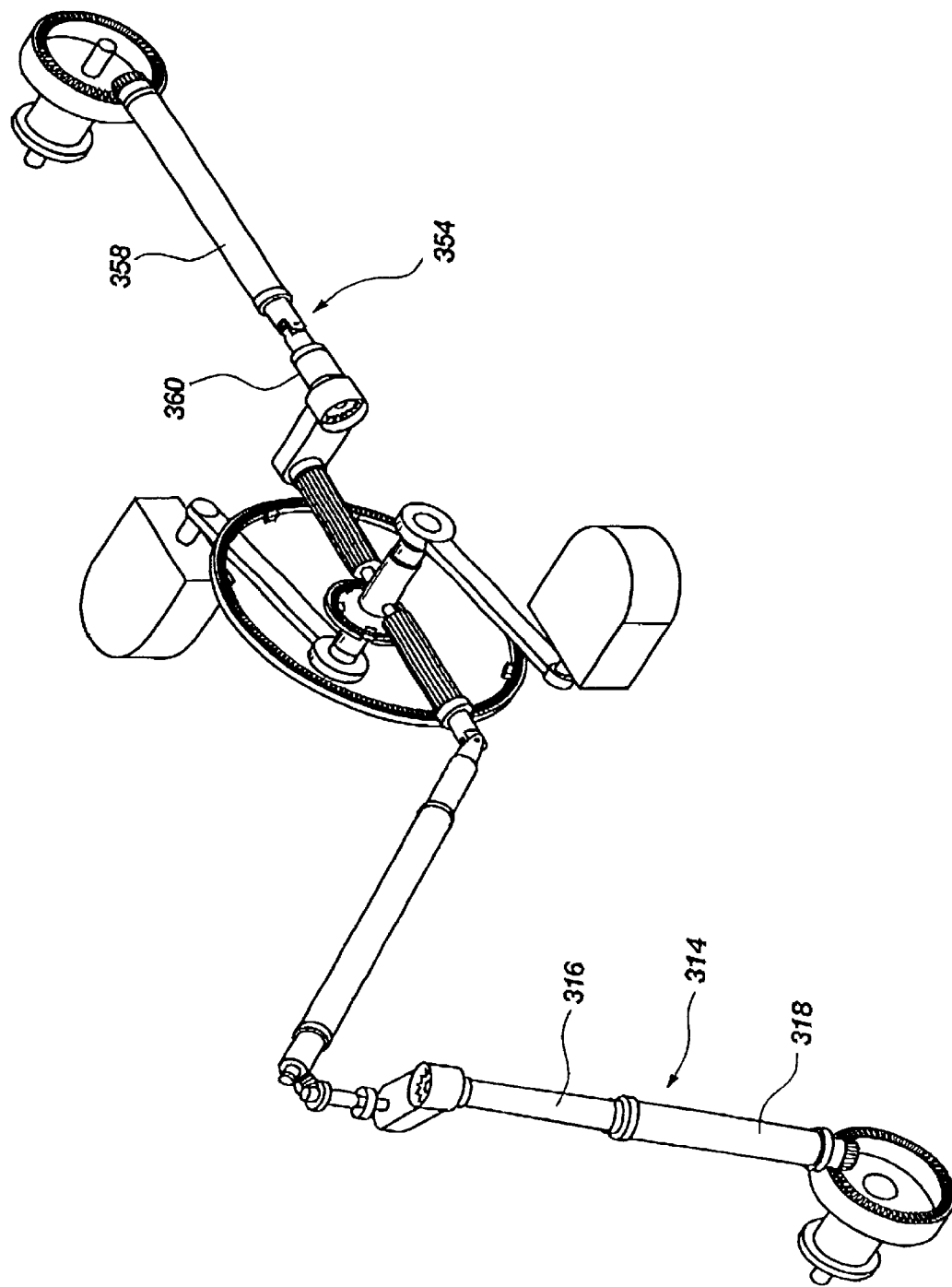
FIG. 17 is a perspective view illustrating the drive train of the embodiment illustrated in FIG. 16.

The foregoing description focuses on a two-wheel drive bicycle having a rigid front fork. A two-wheel drive bicycle having a shock-absorbing front fork is also contemplated. Referring to FIGS. 15–17, for example, a shock-absorbing front fork 300 is illustrated having a first telescoping tube assembly 302 and a second telescoping tube assembly 304. The first telescoping tube assembly 302 includes an upper fork tube 306 and a lower fork tube 308, while the second telescoping tube assembly 304, likewise, includes an upper fork tube 310 and a lower fork tube 312. The upper fork tubes 306, 310 are slidably engaged with their respective lower fork tubes 308, 312 in a manner generally known to one having skill in the art of shock absorbers for bicycles. For example, U.S. Pat. No. 5,269,549 (Wilson et al.), U.S. Pat. No. 5,597,169 (Bradbury) and U.S. Pat. No. 5,848,675 (Gonzalez) describe the construction and operation of various types of bicycle shock absorbers and the specific components used therein. The disclosure of each of these patents is incorporated herein by reference.

In contrast to certain of the components of the front fork 14 previously described, the shock-absorbing front fork 300 includes a telescoping second shaft means 314. The telescoping second shaft means 314 includes an upper shaft 316 and a lower shaft 318. The upper shaft 316 is, preferably, slidably engaged with and inside of the lower shaft 318. Slidable engagement of the upper and lower shafts 316, 318 is accomplished using a spline fit (not referenced). To permit relative sliding movement between the upper and lower fork tubes 306, 308, the lower shaft 318 includes an over-length section 320 of the spline fit whereby the upper shaft 316 is able to slide into the over-length section 320 consistent with the upper fork tube 306 sliding into the lower fork tube 308. Of course, the over-length section 320 must necessarily accommodate the full travel of the shock absorber—that is, the over-length section 320 must have a longitudinal dimension 322 at least as great as the distance the upper tube 306 is permitted to slide inside of the lower tube 308. Otherwise, the travel of the shock-absorbing front fork 300 may be limited by the longitudinal dimension 322 of the over-length section 320.

Further contrasting certain of the components of the front fork 14 previously described, the shock-absorbing front fork 300 also includes two pair of bearings 324, 326. An upper pair of bearings 324 serve to rotatably mount the upper shaft 316 inside of the upper fork tube 306. Similarly, a lower pair of bearings 326 serve to rotatably mount the lower shaft 318 inside of the lower fork tube 308.

Shock absorbing components, such as those described in the foregoing referenced U.S. patents, are positioned in the second telescoping tube assembly 304. For example, a set of elastopolymer bumpers 330 may be positioned in the second telescoping tube assembly as disclosed by U.S. Pat. No. 5,269,549 (Wilson et al.) and U.S. Pat. No. 5,597,169 (Bradbury). This latter patent, moreover, discloses an adjustable travel assembly that may be positioned in the second telescoping tube assembly. More specifically, a compression rod 331 extends from the bottom of the lower fork tube into the upper fork tube. A pair of rebound elastopolymer bumpers 332 are positioned between the flange 333 of the compression rod 331 and the lower end 334 of the upper fork tube 310. The travel of the shock absorber is shortened or lengthened by repositioning bumpers from the rebound set 332 to the main set 330 and vice versa. The benefit of the adjustable travel assembly is that an adjustable travel shock absorber results, which can be accommodated by sizing the longitudinal dimension 322 of the over-length section 320 to allow for an extended travel configuration similar to that disclosed by U.S. Pat. No. 5,597,169 (Bradbury).

Figure 18:
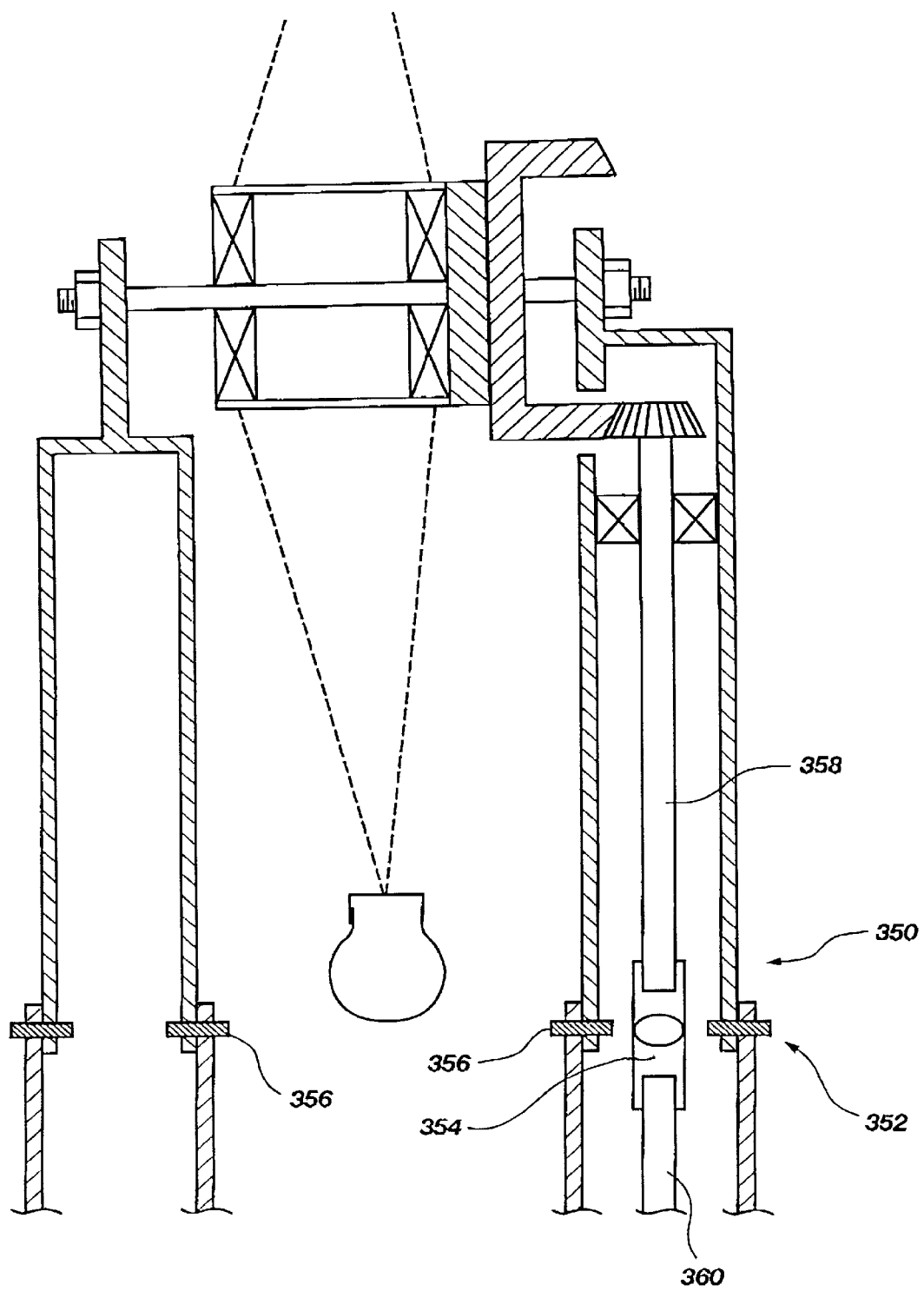
FIG. 18 is a cutaway view of a portion of the rear wheel drive mechanism used in the embodiment illustrated in FIG. 16.

Referring now to FIGS. 16–18, a shock-absorbing rear frame 350, which leads to a full suspension bicycle when combined with the shock-absorbing front fork 300, is illustrated. The shock-absorbing rear frame 350 differs from the previously described rigid rear frame 18 in that a hinge means 352 is added to the chain stays and a universal joint 354 is added to the third shaft means. A standard rear shock 362 absorber is also added at the point of connection of the seat stays and the seat post. The hinge means 352 can be provided by a simple pin or bolt 356 that extends through apertures that are formed in hinges 364 positioned at a point intermediate the ends of the chain stays. The universal joint 354 is positioned proximate the hinge means 352 and is accommodated by cutting the third shaft means in two pieces 358, 360 and positioning the universal joint 354 over the cut ends of the third shaft means (a small amount of the third shaft means may be removed to make room for the universal joint 354).

The above description is directed primarily toward a two-wheel drive bicycle with either a rigid front fork and rear frame or a shock absorbing front fork and rear frame. Nonetheless, it should be appreciated that the main drive means 26 described above may also be used for single-wheel drive bicycles. For example, the front wheel drive means 22 described above can be eliminated, resulting in a bicycle characterized by the main drive means 26 and the rear wheel drive means 24. Similarly, the rear wheel drive means 24 may be eliminated, resulting in a bicycle characterized by the main drive means 26 and the front wheel drive means 22.

In either of the latter cases, only one of the driven shafts of the main drive means 26 will be necessary for operation of the bicycle.

Furthermore, it is contemplated that the components of the above described embodiments can be constructed from materials that exhibit high strength and low weight characteristics. For example, and as noted above, all the components of the above described embodiments may be constructed of either aluminum or titanium or of similar materials commonly used in the construction of bicycle frames and components. Preferably, moreover, each of the shaft means and various gears that make up the front and rear wheel drive means and the main drive means may be constructed of fiber reinforced plastics, which offer superb strength to weight ratios when compared to aluminum, for example. Pulltrusion manufacturing techniques, moreover, may also be used in manufacturing the shaft components. Such manufacturing techniques are performed, for example, by Strongwell Corporation of Bristol, Va.

The two-wheel drive bicycle 10 and the alternative single-wheel bicycle and shock absorbing alternatives have been described with reference to particular embodiments in the foregoing description. Nonetheless, various other modes for carrying out the invention are contemplated as being within the scope of the claims that follow and that particularly point out and distinctly claim the subject matter which is regarded as the invention.

What is claimed:

1. A two-wheel drive bicycle, comprising:
    a main frame, said main frame including a steering head, a seat tube, a cross bar and a hollow downtube, said cross bar having a first end and a second end, said first end of said cross bar being connected to said steering tube and said second end of said cross bar being connected to said seat tube, said hollow downtube having a first end and a second end, said first end of said hollow downtube being connected to said steering head;
    a main drive mechanism, said main drive mechanism including a housing, a driving spindle, at least one driven ring gear, a first driven shaft and a second driven shaft, said housing being connected to said main frame, said driving spindle being rotatably connected to said housing and slidingly engaged with said at least one driven ring gear, said first driven shaft being rotatably connected to said housing and selectively engaged with said at least one driven ring gear, and said second driven shaft being rotatably connected to said housing and selectively engaged with said at least one driven ring gear;
    a front fork, said front fork including a hollow fork tube having a first end and a second end, said first end of said hollow fork tube being pivotally connected to said steering head;
    a front wheel, said front wheel being rotatably connected to said front fork proximate said second end of said hollow fork tube;
    a rear frame, said rear frame including a seat stay and a hollow chain stay, said seat stay having a first end and a second end, said first end of said seat stay being connected to said seat tube, said hollow chain stay having a first end and a second end, said first end of said hollow chain stay being connected to said housing and said second end of said hollow chain stay being connected to said second end of said seat stay;
    a rear wheel, said rear wheel being rotatably connected to said rear frame proximate said second end of said chain stay;
    a front wheel drive mechanism, said front wheel drive mechanism including a first shaft means rotatably positioned inside of said hollow downtube and a second shaft means rotatably positioned inside said hollow fork tube, said first shaft means having a first end operably coupled to said first driven shaft and a second end, said second shaft means having a first end operably coupled to said second end of said first shaft means and a second end operably coupled to said front wheel; and
    a rear wheel drive mechanism, said rear wheel drive mechanism including a third shaft means rotatably positioned inside of said hollow chain stay, said third shaft means having a first end operably coupled to said second driven shaft and a second end operably coupled to said rear wheel.

2. The two-wheel drive bicycle of claim 1, wherein said main drive mechanism includes a plurality of driven ring gears, said plurality of driven ring gears comprising a series of concentrically spaced ring gears, each ring gear of said plurality of driven ring gears having an inner diametrical surface and an outer diametrical surface, each said outer diametrical surface being configured to engage the inner diametrical surface of an adjacent ring gear.

3. The two-wheel drive bicycle of claim 2, wherein said main drive mechanism further includes:
    biasing means for biasing each ring gear of said plurality of driven ring gears away from said first driven shaft and said second driven shaft and
    selective engagement means for selectively engaging one of said plurality of ring gears with said first driven shaft and said second driven shaft.

4. The two-wheel bicycle of claim 3, wherein said biasing means includes:
    a first plurality of roller means for rolling contact with said plurality of driven ring gears, each one of said first plurality of roller means being positioned adjacent to and in contact with a corresponding one of said plurality of driven ring gears,
    a plurality of spring means, each one of said plurality of spring means being positioned adjacent to and in contact with a corresponding one of said first plurality of roller means,
    guide means for maintaining each one of said first plurality of roller means in alignment with said corresponding one of said plurality of driven ring gears and
    reaction surface means positioned adjacent and in contact with said plurality of spring means.

5. The two-wheel bicycle of claim 3, wherein said selective engagement means includes:
    a second plurality of roller means for rolling contact with said plurality of driven ring gears, each one of said second plurality of roller means being positioned adjacent to a corresponding one of said plurality of driven ring gears,
    guide means for maintaining each one of said second plurality of roller means in alignment with said corresponding one of said plurality of driven ring gears,
    cam means for selectively engaging one of said second plurality of roller means with said corresponding one of said plurality of driven ring gears and for urging said corresponding one of said plurality of driven ring gears into contact with said first driven shaft and said second driven shaft, said cam means being slidingly engaged with a track means, said track means being positioned adjacent said guide means, and a shift mechanism, said shift mechanism being mechanically associated with said cam means.

6. The two-wheel drive bicycle of claim 1, wherein said front wheel drive mechanism includes:
 a universal joint, said universal joint having a first end connected to said first driven shaft and a second end connected to said first end of said first shaft means,
 a first intermediate shaft means rotatably positioned in said steering head, said first intermediate shaft means having a first end and a second end,
 a first bevel gear connected to said second end of said first shaft member and a second bevel gear connected to said first end of said first intermediate shaft means, said first bevel gear and said second bevel gear being in operable engagement with one another,
 a first spur gear connected to said second end of said first intermediate shaft means and a second spur gear connected to said first end of said second shaft member, said first spur gear and said second spur gear being in operable engagement with one another, and
 a third bevel gear connected to said second end of said second shaft means and a fourth bevel gear connected to said front wheel, said third bevel gear and said fourth bevel gear being in operable engagement with one another.

7. The two-wheel drive bicycle of claim 1, wherein said rear wheel drive mechanism includes:
 a first spur gear connected to said second driven shaft and a second spur gear connected to said first end of said third shaft means, said first spur gear and said second spur gear being in operable engagement with one another, and
 a first bevel gear connected to said second end of said third shaft means and a fourth bevel gear connected to said rear wheel, said first bevel gear and said second bevel gear being in operable engagement with one another.

8. The two-wheel drive bicycle of claim 1, further including:
 a shock absorber positioned between said first end of said seat stay and said seat tube and
 a hinge means positioned between said first end of said hollow chain stay and said housing.

9. The two wheel drive bicycle of claim 8, wherein said hinge means includes a hollow extension connected to said housing and wherein said rear wheel drive mechanism includes:
 a fourth shaft means rotatably positioned inside of said hollow extension, said fourth shaft means having a first end a second end,
 a first spur gear connected to said second driven shaft and a second spur gear connected to said first end of said fourth shaft means, said first spur gear and said second spur gear being in operable engagement with one another,
 a universal joint, said universal joint having a first end connected to said second end of said fourth shaft means and a second end connected to said first end of said third shaft means, and
 a first bevel gear connected to said second end of said third shaft means and a fourth bevel gear connected to said rear wheel, said first bevel gear and said second bevel gear being in operable engagement with one another.

10. The two-wheel drive bicycle of claim 1, wherein said front fork further includes a second hollow tube telescopingly connected with said hollow tube and wherein said second shaft means includes a first telescoping member and a second telescoping member disposed axially and slidingly within said first telescoping member, said first telescoping member and said second telescoping member having spline means to prevent relative rotational movement therebetween, said first telescoping member being operably connected to said front wheel and said second telescoping member being operably coupled to said second end of said first shaft means.

11. A two-wheel drive bicycle, comprising:
 a main frame, said main frame including a steering head, a seat tube, a cross bar and a hollow downtube, said cross bar having a first end and a second end, said first end of said cross bar being connected to said steering tube and said second end of said cross bar being connected to said seat tube, said hollow downtube having a first end and a second end, said first end of said hollow downtube being connected to said steering head;
 front fork means for steerably and rotatably connecting a front wheel to said main frame, said front fork means being pivotally connected to said steering head;
 a front wheel, said front wheel being rotatably connected to said front fork means;
 rear frame means for rotatably connecting a rear wheel to said main frame, said rear frame means being connected to said main frame;
 a rear wheel, said rear wheel being rotatably connected to said rear frame means;
 front wheel drive means for rotatably driving said front wheel, said front wheel drive means being operably coupled to said front wheel;
 rear wheel drive means for rotatably driving said rear wheel, said rear wheel drive means being operably coupled to said rear wheel; and
 main drive means for operating both said front wheel drive means and said rear wheel drive means, said main drive means being connected to said main frame and being operably coupled to both said front wheel drive means and said rear wheel drive means.

12. The two-wheel drive bicycle of claim 11, wherein said main drive means includes a housing, a driving spindle, at least one driven ring gear, a first driven shaft and a second driven shaft, said housing being connected to said main frame, said driving spindle being rotatably connected to said housing and slidingly engaged with said at least one driven ring gear, said first driven shaft being rotatably connected to said housing and selectively engaged with said at least one driven ring gear, and said second driven shaft being rotatably connected to said housing and selectively engaged with said at least one driven ring gear.

13. The two-wheel bicycle of claim 12, wherein said front fork means includes a first fork tube having a hollow portion therein and wherein said front wheel drive means includes a first shaft means rotatably positioned inside of said hollow downtube and a second shaft means rotatably positioned inside said hollow portion of said first fork tube, said first shaft means having a first end operably coupled to said first driven shaft and a second end, said second shaft means having a first end operably coupled to said second end of said first shaft means and a second end operably coupled to said front wheel.

14. The two-wheel drive bicycle of claim 13, wherein said rear frame means includes a chain stay having a hollow portion therein and wherein said rear wheel drive means includes a third shaft means rotatably positioned inside of said hollow portion of said chain stay, said third shaft means having a first end operably coupled to said second driven shaft and a second end operably coupled to said rear wheel.

15. The two-wheel drive bicycle of claim 12, wherein said front fork further includes a second fork tube having a hollow portion therein, said second fork tube being telescopingly connected with said first fork tube and wherein said second shaft means includes a first telescoping member and a second telescoping member disposed axially and slidingly within said first telescoping member, said first telescoping member and said second telescoping member having spline means to prevent relative rotational movement therebetween, said first telescoping member being operably connected to said front wheel and said second telescoping member being operably coupled to said second end of said first shaft means.

16. A shaft drive bicycle, comprising:
   a frame, said frame including a steering head and a hollow downtube, said hollow downtube having a first end and a second end, said first end of said hollow downtube being connected to said steering head;
   a main drive mechanism, said main drive mechanism including a housing, a driving spindle, at least one driven ring gear and a first driven shaft, said housing being connected to said frame, said driving spindle being rotatably connected to said housing and slidingly engaged with said at least one driven ring gear, said first driven shaft being rotatably connected to said housing and selectively engaged with said at least one driven ring gear;
   a front fork, said front fork including a hollow fork tube having a first end and a second end, said first end of said hollow fork tube being pivotally connected to said steering head;
   a front wheel, said front wheel being rotatably connected to said front fork proximate said second end of said hollow fork tube;
   a rear wheel, said rear wheel being rotatably connected to said frame; and
   a front wheel drive mechanism, said front wheel drive mechanism including a first shaft means rotatably positioned inside of said hollow downtube and a second shaft means rotatably positioned inside said hollow fork tube, said first shaft means having a first end operably coupled to said first driven shaft and a second end, said second shaft means having a first end operably coupled to said second end of said first shaft means and a second end operably coupled to said front wheel.

17. The shaft drive bicycle of claim 16, wherein said main drive mechanism includes a plurality of driven ring gears, said plurality of driven ring gears comprising a series of concentrically spaced ring gears, each ring gear of said plurality of driven ring gears having an inner diametrical surface and an outer diametrical surface, each said outer diametrical surface being configured to engage the inner diametrical surface of an adjacent ring gear.

18. The shaft drive bicycle of claim 17, wherein said main drive mechanism further includes:
   biasing means for biasing each ring gear of said plurality of driven ring gears away from said driven shaft and selective engagement means for selectively engaging one of said plurality of ring gears with said driven shaft.

19. A shaft drive bicycle, comprising:
   a frame, said frame including a steering head, a seat tube and a downtube;
   a main drive mechanism, said main drive mechanism including a housing, a driving spindle, at least one driven ring gear and a driven shaft, said housing being connected to said frame, said driving spindle being rotatably connected to said housing and slidingly engaged with said at least one driven ring gear, said driven shaft being rotatably connected to said housing and selectively engaged with said at least one driven ring gear;
   a front fork pivotally connected to said steering head;
   a front wheel, said front wheel being rotatably connected to said front fork;
   a rear frame, said rear frame including a seat stay and a hollow chain stay, said seat stay having a first end and a second end, said first end of said seat stay being connected to said seat tube, said hollow chain stay having a first end and a second end, said first end of said hollow chain stay being connected to said housing and said second end of said hollow chain stay being connected to said second end of said seat stay;
   a rear wheel, said rear wheel being rotatably connected to said rear frame proximate said second end of said chain stay; and
   a rear wheel drive mechanism, said rear wheel drive mechanism including a shaft means rotatably positioned inside of said hollow chain stay, said shaft means having a first end operably coupled to said driven shaft and a second end operably coupled to said rear wheel.

20. The shaft drive bicycle of claim 19, wherein said main drive mechanism includes a plurality of driven ring gears, said plurality of driven ring gears comprising a series of concentrically spaced ring gears, each ring gear of said plurality of driven ring gears having an inner diametrical surface and an outer diametrical surface, each said outer diametrical surface being configured to engage the inner diametrical surface of an adjacent ring gear.

21. The shaft drive bicycle of claim 20, wherein said main drive mechanism further includes: biasing means for biasing each ring gear of said plurality of driven ring gears away from said driven shaft and selective engagement means for selectively engaging one of said plurality of ring gears with said driven shaft.

22. A transmission for a bicycle having a frame and front and rear wheels, said transmission comprising:
   a housing, a driving spindle, at least one driven ring gear and a driven shaft, said housing being connected to said frame, said driving spindle being rotatably connected to said housing and slidingly engaged with said at least one driven ring gear, said driven shaft being rotatably connected to said housing and selectively engaged with said at least one driven ring gear.

23. The transmission of claim 22, wherein said transmission further includes a plurality of driven ring gears, said plurality of driven ring gears comprising a series of concentrically spaced ring gears, each ring gear of said plurality of driven ring gears having an inner diametrical surface and an outer diametrical surface, each said outer diametrical surface being configured to engage the inner diametrical surface of an adjacent ring gear.

24. The transmission of claim 23, wherein said transmission further includes:
   biasing means for biasing each ring gear of said plurality of driven ring gears away from said driven shaft and
   selective engagement means for selectively engaging one of said plurality of ring gears with said driven shaft.

25. The transmission of claim 24, wherein said biasing means includes:

a first plurality of roller means for rolling contact with said plurality of driven ring gears, each one of said first plurality of roller means being positioned adjacent to and in contact with a corresponding one of said plurality of driven ring gears, a plurality of spring means, each one of said plurality of spring means being positioned adjacent to and in contact with a corresponding one of said first plurality of roller means, guide means for maintaining each one of said first plurality of roller means in alignment with said corresponding one of said plurality of driven ring gears and reaction surface means positioned adjacent and in contact with said plurality of spring means.

26. The transmission of claim 25, wherein said selective engagement means includes:

a second plurality of roller means for rolling contact with said plurality of driven ring gears, each one of said second plurality of roller means being positioned adjacent to a corresponding one of said plurality of driven ring gears, guide means for maintaining each one of said second plurality of roller means in alignment with said corresponding one of said plurality of driven ring gears, cam means for selectively engaging one of said second plurality of roller means with said corresponding one of said plurality of driven ring gears and for urging said corresponding one of said plurality of driven ring gears into contact with said driven shaft, said cam means being slidingly engaged with a track means, said track means being positioned adjacent said guide means, and a shift mechanism, said shift mechanism being mechanically associated with said cam means.

* * * * *